United States Patent
Pathak et al.

(10) Patent No.: US 10,469,882 B2
(45) Date of Patent: Nov. 5, 2019

(54) SYSTEM AND METHOD OF SERVER-SIDE AD INSERTION FOR OVER THE TOP (OTT) STREAMS

(71) Applicant: M/S. Amagi Media Labs Pvt. Ltd, Bangalore (IN)

(72) Inventors: Abhijit Chandrashekhar Pathak, Bengaluru (IN); Suraj Korukonda, Bengaluru (IN); Keerthan Kedumpadi Shivarama, Bengaluru (IN)

(73) Assignee: M/s. Amagi Media Labs Pvt. Ltd, Bangalore (IN)

( * ) Notice: Subject to any disclaimer, the term of this patent is extended or adjusted under 35 U.S.C. 154(b) by 0 days.

(21) Appl. No.: 15/947,941

(22) Filed: Apr. 9, 2018

(65) Prior Publication Data
US 2019/0313135 A1 Oct. 10, 2019

(51) Int. Cl.
H04N 21/234 (2011.01)
H04N 21/81 (2011.01)
G06Q 30/02 (2012.01)
H04N 21/643 (2011.01)
H04N 21/858 (2011.01)

(52) U.S. Cl.
CPC ... *H04N 21/23424* (2013.01); *G06Q 30/0277* (2013.01); *H04N 21/643* (2013.01); *H04N 21/812* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 7,203,758 B2 * | 4/2007 | Cook | H04N 7/165 348/E7.063 |
| 8,949,886 B2 * | 2/2015 | Acharya | H04L 65/4084 725/34 |
| 9,301,020 B2 * | 3/2016 | Sun | H04N 21/26258 |
| 9,479,801 B2 * | 10/2016 | Higgs | H04H 20/106 |
| 9,743,156 B1 * | 8/2017 | McLean | H04N 21/812 |
| 10,182,269 B1 * | 1/2019 | Samant | H04N 21/6405 |
| 2006/0287915 A1 * | 12/2006 | Boulet | G06Q 30/02 705/14.61 |

(Continued)

*Primary Examiner* — Alexander Q Huerta
(74) *Attorney, Agent, or Firm* — Laurence P. Colton; Smith Tempel Blaha LLC

(57) ABSTRACT

A scalable, multi-platform, seamless Server-side Ad-Insertion system and method with a single stream input and output having an Advertisement Detector and Playlist Instrumenter (ADPI) which puts out Advertisement Break position and duration for an Advertisement Replacement System (ARS) and a Common Instrumented Playlist (CIP) for the users, a Load Switch to balance the ADPI and ARS loads when they need to scale according to user-demand, and a plurality of users on a plurality of devices and platforms communicating with the ARS. The ARS communicates with the Advertisement Server to enable fetching advertisements for every user and reports successful advertisement playback. The CIP contains a list of URLs having Beacon redirections which are added periodically to indicate user presence to the ARS and content URLs. ServeAd redirections is added to the ARS only during advertisement break so that ARS can replace in-stream advertisements.

13 Claims, 18 Drawing Sheets

(56) References Cited

U.S. PATENT DOCUMENTS

| | | | | |
|---|---|---|---|---|
| 2011/0246661 A1* | 10/2011 | Manzari | G06Q 30/02 |  |
| | | | 709/231 |  |
| 2012/0110618 A1* | 5/2012 | Kilar | G06Q 30/02 |  |
| | | | 725/34 |  |
| 2012/0167132 A1* | 6/2012 | Mathews | H04N 21/25808 |  |
| | | | 725/32 |  |
| 2013/0080579 A1* | 3/2013 | Gordon | H04L 65/608 |  |
| | | | 709/217 |  |
| 2014/0075466 A1* | 3/2014 | Zhao | H04N 21/4784 |  |
| | | | 725/23 |  |
| 2014/0150019 A1* | 5/2014 | Ma | G06Q 30/0251 |  |
| | | | 725/34 |  |
| 2016/0073176 A1* | 3/2016 | Phillips | H04N 21/2402 |  |
| | | | 725/35 |  |
| 2016/0337695 A1* | 11/2016 | Muller | H04N 21/25883 |  |
| 2017/0134466 A1* | 5/2017 | Giladi | H04L 65/602 |  |
| 2017/0359628 A1* | 12/2017 | Sachdev | H04N 21/812 |  |
| 2018/0343484 A1* | 11/2018 | Loheide | H04N 21/2393 |  |

\* cited by examiner

Input Variant Playlist 475
{
EXT-X-MEDIA-SEQUENCE:1
http://sample.com/low-variant/C1.ts
475a http://sample.com/low-variant/C2.ts
http://sample.com/low-variant/C3.ts
http://sample.com/low-variant/C4.ts
http://sample.com/low-variant/C5.ts {Advertisement} 475b
http://sample.com/low-variant/C6.ts {Advertisement} 475c
http://sample.com/low-variant/C7.ts
http://sample.com/low-variant/C8.ts
}

Output Variant Playlist 476
{ #EXT-X-MEDIA-SEQUENCE:1
http://sample.com/low-variant/C1.ts
476a http://sample.com/low-variant/C2.ts
http://product.company.com/beacon?chn=hbo&redir=http://sample.com/low-variant/C3.ts {Made into Beacon}
http://sample.com/low-variant/C4.ts
EXT-X-DISCONTINUITY
http://product.company.com/serveAd?stream-id=hbo&seq=5&variant=low-variant&redir=http://product.company.com/low-variant/seg51.ts {Made into ServeAd} 476b
http://product.company.com/serveAd?stream-id=hbo&seq=6&variant=low-variant&redir=http://product.company.com/low-variant/seg52.ts {Made into ServeAd} 476c
EXT-X-DISCONTINUITY
http://product.company.com/serveAd?stream-id=hbo&seq=7&variant=low-variant&redir=http://product.company.com/low-variant/seg61.ts {Made into ServeAd} 476d
EXT-X-DISCONTINUITY
http://product.company.com/serveAd?stream-id=hbo&seq=8&variant=low-variant&redir=http://product.company.com/low-variant/seg62.ts {Made into ServeAd} 476e
EXT-X-DISCONTINUITY
http://sample.com/low-variant/C7.ts
http://sample.com/low-variant/C8.ts
}

Figure 4(d)

Output Variant (TBD Supporting Device), e.g. User-1 556

EXT-X-MEDIA-SEQUENCE:1 http://t-storm.amagi.com/beacon?chn=hbo&redir=http://sample.com/lo-variant/C1.ts {Beacon}

{Lower URL will serve chopped C2 from C2A1.ts}
http://t-storm.amagi.com/content?chn=hbo&variant=low-variant&seq=2
556a
EXT-X-DISCONTINUITY
http://t-storm.amagi.com/serveAd?chn=hbo&seq=3&variant=low-variant&redir=http://t-storm.amagi.com/low-variant/segA11.ts {serveAd}
EXT-X-DISCONTINUITY
http://t-storm.amagi.com/serveAd?chn=hbo&seq=4&variant=low-variant&redir=http://t-storm.amagi.com/low-variant/segA12.ts {serveAd}
EXT-X-DISCONTINUITY
http://t-storm.amagi.com/serveAd?chn=hbo&seq=5&variant=low-variant&redir=http://t-storm.amagi.com/low-variant/segA13.ts {serveAd}
EXT-X-DISCONTINUITY
http://t-storm.amagi.com/serveAd?chn=hbo&seq=6&variant=low-variant&redir=http://t-storm.amagi.com/low-variant/segA14.ts {serveAd}
EXT-X-DISCONTINUITY
http://t-storm.amagi.com/serveAd?chn=hbo&seq=7&variant=low-variant&redir=http://t-storm.amagi.com/low-variant/segA15.ts {serveAd}
EXT-X-DISCONTINUITY
http://t-storm.amagi.com/content?chn=hbo&variant=low-variant&seq=8
{Lower URL will serve chopped C3 from A4C3.ts}
http://sample.com/low-variant/C4.ts
}

Output Variant (non-TBD Device), e.g. User-2 557

EXT-X-MEDIA-SEQUENCE:1 http://product.company.com/beacon?chn=hbo&redir=http://sample.com/lo-variant/C1.ts {Beacon}

{Lower URL will serve chopped C2 from C2A1.ts}
http://product.company.com/content?chn=hbo&variant=low-variant&seq=2
557a
http://product.company.com/serveAd?chn=hbo&seq=3&pts2rts=240&variant=low-variant &redir=http://product.company.com/low-variant/segA1.ts {serveAd}
http://product.company.com/serveAd?chn=hbo&seq=4&pts2rts=300&variant=low-variant &redir=http://product.company.com/low-variant/segA2.ts {serveAd}
http://product.company.com/serveAd?chn=hbo&seq=5&pts2rts=360&variant=low-variant &redir=http://product.company.com/low-variant/segA3.ts {serveAd}
http://product.company.com/serveAd?chn=hbo&seq=6&pts2rts=420&variant=low-variant &redir=http://product.company.com/low-variant/segA4.ts {serveAd}
http://product.company.com/serveAd?chn=hbo&seq=7&pts2rts=480&variant=low-variant &redir=http://product.company.com/low-variant/segA5.ts {serveAd}
{Lower URL will serve chopped C3 from A4C3.ts}
http://product.company.com/content?chn=hbo&variant=low-variant&seq=8
http://sample.com/low-variant/C4.ts
}

Figure 5(b) Continued

SYSTEM AND METHOD OF SERVER-SIDE AD INSERTION FOR OVER THE TOP (OTT) STREAMS

STATEMENT OF RELATED APPLICATIONS

None.

BACKGROUND OF THE INVENTION

Technical Field

Over the last few years as end-users, we have gotten used to consuming content on the Internet via websites and applications like YouTube. These websites and players show content and advertisements interleaved. Often, we notice that when advertisements are played, the Player Application pauses content playback, plays advertisements and subsequently resumes playback. There is a quality mismatch, buffering when the advertisement loads and when content playback resumes. User-experience is not as seamless as TV. Most of us let go, some of us install Adblockers to relieve ourselves out of this. Adblocker software(s) is available for every platform so that playback of advertisements alone could be restricted when it is due, and thus content plays uninterrupted. Blocking ads is not business friendly, Adblockers incur significant advertisement revenue loss to content broadcasters. This technique is called Client-Side Ad-insertion (CSAI).

Server-side ad-insertion (SSAI) solves this problem of buffering and quality mismatch during playback, providing a seamless user-experience like TV and makes ad blockers ineffective. SSAI fetches advertisements per user server side, transcode them to match the quality and serves them along with content. This, in turn, requires tracking and uniquely identifying users.

Typical SSAI achieves this by serving different playback stream per user. As advertisements fetched may be different per user, serving them along with content mandates forming unique playback streams. Serving unique streams have scaling challenges, i.e., serving a million users require million playlist(s) to be served all the time irrespective of whether an advertisement break is part of playback schedule or not. Moreover, this is counter-intuitive to the Internet world, where single website serves all users and differentiates between them based on Cookie.

The SSAI solution proposed here is different and manages this feat by serving single instrumented stream or playlist for all users. User identification and tracking are done by inserting periodic PING like redirections in a playlist called Beacons. User-specific advertisements are served by redirecting the user to a per-use advertisement builder and aggregator subsystem of the proposed SSAI. These redirections are called ServeAds. This mechanism is more Internet-like, where all users have a single website to access, and yet advertisements are served to match their browsing pattern. A solution has to handle scale only to serve advertisements. A single instrumented playlist to all users makes it easy to integrate with user authorization and authentication systems and with content delivery networks for handling scale.

This section illustrates a Client-side Ad-insertion (CSAI) and issues around it, including integration and customization with all available Consumer Electronic (CE) devices. Users nowadays consume the content on Smart TVs, mobile devices, tablets, laptops, websites, simple adapters like Chromecast and Roku. As CSAI detects and inserts advertisements on the Client side, CSAI demands to maintain applications for every platform a content producer intends to cater users for. This makes CSAI unattractive and discouraging for almost every content producer.

Players Application are served content streams laden with advertisement markers. These markers define where in-stream ad-begins and ad-end positions. Advertisement Detection and Playback Control (ADPC) launches a Content Player and starts stream playback. Periodically, the ADPC detects in-stream advertisement and informs an Advertisement Requester to fetch ads for an advertisement spot. The Advertisement Requester carries advertisements from an Advertisement Server. If the Advertisement Requester is successful in fetching the advertisements, the ADPC pauses the Content Player and plays the advertisement through an Advertisement Player. The Advertisement Player notifies the ADPC about the playback completion. The ADPC reports to the Advertisement Server about the advertisement played. This is reported in multiples of 25% of the advertisement duration and hence called Quartile Reporting. The ADPC resumes the Content Player.

In case an adblocker is installed, advertisement fetching by the Advertisement Requester fails, and the Content Player plays back the stream uninterrupted. Since the advertisements and content are played from different sources, they have different stream quality attributes. At times this method results in buffering or visible quality mismatch. The adblocker also can block the reporting of the ADPC to the Advertisement Server mentioned above, causing revenue loss even if the advertisement has played. The CSAI is still quite common and used typically in players like YouTube, HotStar, etc.

Definitions below set the stage for proposed Server-side Ad-insertion (SSAI) solution by introducing terminologies involved.

Segment: Streaming media is served as a stream of short video (A/V) files, every such file is called segment or chunk.

Variant: Stream of distinct resolutions and bitrates is called variant. Streaming media is served by many variants to cater to different devices and fluctuating bitrates.

User-Agent: Every Browser and Streaming Media Player sends across his playback capabilities as HTTP header called User-Agent header.

Trigger: Media Stream input has to have content-advertisement boundary information called trigger, as a playlist parameter or inside media segment.

Timestamp (PTS): Segment has separate A/V streams with playback timestamp (PTS) information, this is to aid a player in playing A/V streams in synchronization. PTS is also termed as presentation time stamp, signifying time reference at which respective audio or video frame can be rendered.

Discontinuity: Streaming media may contain A/V segments with different timestamp and A/V properties, but this needs to be distinctly informed in variant so that player handles change. This information goes as 'Discontinuity' information in a variant.

TBD: TBD in this document represent Time Discontinuity in streaming media.

Beacons: Product inserts periodic redirections to itself in output variant playlist, so that users watching stream can be tracked. These types of redirections are called Beacon.

ServeAd: Product inserts redirections to itself during advertisement break, these redirections serve different advertisements fetched for different users when requested from the players. These are called ServeAd redirections.

Filler: Product plays a supplement video in case advertisement doesn't fit in segment boundary. Such video is called filler.

Platform: Operating system software which provides subsystem and environment to develop and execute applications over it (E.g., Windows, iOS, Android).

Broadcaster: Organization or individual publishing adaptive bitrate stream input to SSAI.

CDN: Content Delivery Network is an interconnected system of cache servers that use geographical proximity as a criterion for delivering web content.

CE device: Consumer Electronic device, i.e., devices like mobile phone, tablets, smart TV, Roku, Chromecast, etc. In the context of innovation devices which come with an ability to stream content from the internet.

Periods: Mpeg-DASH specification uses a term called Period to a described portion of the stream with start time and duration. Different Periods can be used for different scenes, chapters or to separate content and advertisements. Periods in Mpeg-DASH represent discontinuities explained above.

VAST: VAST (Video Ad Serving Template) is a specification released by the Interactive Advertising Bureau (IAB) which sets a standard for communication requirements between ad servers and video players.

BRIEF SUMMARY OF THE INVENTION

A scalable, multi-platform, seamless Server-side Ad-Insertion (SSAI) system with a single stream input and output having a Stream Playout, an Advertisement Detector and Playlist Instrumenter (ADPI), a Load Switch, an Advertisement Replacement System (ARS), an Advertisement Server, a plurality of users, and one or more third parties. An adaptive input stream having content and advertisement triggers is sent. The ADPI puts out Advertisement Break position and duration for the ARS and a Common Instrumented Playlist (CIP) for the users. The CIP contains a list of URLs which includes content URLs, Beacon redirections, and ServeAd redirections. The Beacon redirections are added periodically in the CIP so that the users often reach out to the ARS to mark their presence. The ServeAd redirections are added to the ARS only during an advertisement break so that the ARS can replace in-stream advertisements. The ADPI looks for different types of advertisement cues in input manifest and Content Segments and sends detected cues to the Advertisement Replacement System (ARS) as the Advertisement Break position and duration.

The Advertisement Break position and duration includes Media sequence, Presentation Timestamp (PTS) in Media segment where the advertisement Audio/Video (A/V) begins or ends, duration, and cue type. The ADPI chops detected advertisements into constant duration segments and add a matching number of ServeAd redirections in the CIP with URL to a chopped segment as URL parameter, thus gives the flexibility to replace any detected advertisement with multiple combinations of unrelated advertisements. The ADPI and ARS are load-balanced by the Load Switch when they need to scale according to user-demand. During the scaling process, the ARS cannot serve the replacements or track users. When the ARS starts scaling, it sends a signal to the ADPI asking the ADPI not to add the Beacons or ServeAds redirections in the CIP for the duration of scaling. Post scaling the ARS informs the ADPI to start adding the Beacons or ServeAd redirections again. The ARS communicates with the Advertisement Server to enable fetching advertisements for every user and reports successful advertisement playback. The ARS receives periodic Beacon redirections from the plurality of users as the users play the CIP. The ARS tracks the users based on parameters like IP Address, User-Agent, Cookie or any other parameter like device-ID made available, thus the ARS knows active users playing the CIP all the time. For each active user, for every break information received from the ADPI, the ARS requests advertisements from the Advertisement Server. The Advertisement Server responds with an acknowledgment message, said response includes an advertisement, if available with the Advertisement Server. Request Fetched advertisements parameters sent to the Advertisement Server includes duration, unique user identifier, IP Address and User-Agent representing the user request sent for. When the users reach out to the ARS during the ServeAd redirections, said ARS serves them the Fetched advertisements. The ARS redirects users to replace advertisement segment if fetched, else use chopped original advertisement segments. The ARS reports Quartiles for all users and all breaks, once the segment is downloaded by the user's player.

A plurality of users on a plurality of devices and platforms communicate with the ARS. An output stream sends the periodic Beacon redirections to the ARS for tracking the active users and sends the ServeAd redirections that facilitate serving different advertisement per user to the ARS for every segment of a detected advertisement. The user's player fetches the unmodified Content Segments from the Stream Playout. The user's player requests advertisement segment as per the CIP from the ARS based on the ServeAd redirections. Third parties are Stream Playout and Advertisement Server(s).

In this invention, the adaptive input stream carries content and advertisement cues, where cue information, maybe blended in Audio and Video (as non-visible or audible information), a separate metadata stream with cue information or could be in-stream manifest and may be standard like SCTE35, DTMF tones and non-standard like system watermark. The Advertisement Replacement System (ARS) further comprises a Replacement Advertisement Builder (RAB), a User Tracker server (UTS), an Advertisement Transcoder, a Replacement Content Server (RCS), a Quartile Reporter, a Trans-coded content store, and Load Switch.

The Replacement Advertisement Builder (RAB), receives frame accurate information about detected advertisement break from the ADPI in the form of Advertisement Break position and duration, receives a list of active users from the User Tracker Server (UTS), fetches advertisements for all active users, covered by Advertisement Request and Response and transcodes advertisements with the help of the Advertisement Transcoder, sends transcoding requests for every unique advertisement received from the Advertisement Server, and maintains replacement advertisement mapping per active user, per detected advertisement segment, such that the mapping format is {media sequence, stream-Id, user-Id, replaced segment, reporting URLs}. Users play CIP and periodically reach out to the User Tracker Server (UTS). Tracks the users uniquely based on Cookie (if supported by player) or by User-Agent, IP Address and or by any other identifier like device-Id provided by the Player Application. Redirects the users back to content segment received as URL parameter in Beacon redirections. The Advertisement Transcoder receives advertisement transcoding requests from the RAB, performs format conversion of received advertisements from the Advertisement Server to match quality attributes of the adaptive input stream played by Stream Playout, and chunks received advertisements into segments of duration matching chopped input advertisement segments.

The users (devices of end users) play the CIP and reach out to the Replacement Content Server (RCS) during an advertisement break, said RCS fetches replacement mapping for a ServeAd request when the ServeAd redirections reach the RCS and notify the Quartile Reporter to Report Quartiles for downloaded advertisement segment with reporting URL. The Quartile Reporter does Quartile reporting once it receives advertisement segment download confirmation and reporting URL from the RCS which is done for all Quartiles, for all replacement advertisements, for all breaks, and for all users. The Trans-coded Content Store stores the output of the Advertisement Transcoder that transcodes advertisement in A/V format matching input stream A/V characteristics. The Load Switch is a switch to stop insertion of ServeAd and Beacon redirections when the ARS has exceeded its capacity to serve replacement advertisements, said Load Switch is instructed to start insertion of ServeAd and Beacon redirections again when the ARS is reconfigured to meet higher demand.

The Advertisement Detector and Playlist Instrumenter (ADPI) further comprises a Stream Receiver, Parser, and Decoder, a Cue Detector, a Break Aggregator, a Boundary Annealer and Segmenter, a Segment Store, a Playlist Builder, and a Playlist Server. The Stream Receiver, Parser, and Decoder, further comprises, a Stream Receiver that handles authentication and authorization schemes as applicable and hands over a playlist variant stream to a Parser, the Parser parses chosen playlist variant, downloads each segment, the Decoder does content decryption if adaptive input stream is DRM protected, and the Stream Receiver, Parser, and Decoder hands over downloaded segment along with header information (found over segment URL) to the Cue Detector.

The Cue Detector further, receives the downloaded segment along with the header information in input stream variant, the cue information may be available as an encoded header in playlist variant just above segment URL or in a Content Segment, and looks for advertisement cues (standard or non-standard), in headers or Content Segment, the cue information is passed on to the Break Aggregator. The Break Aggregator aggregates smaller breaks into a larger break, to facilitate larger choice for a replacement. Also, it breaks very large advertisement breaks into reasonable size chunks wherein break information is conveyed in the format, {Splice PTS, Break Type, Media Index, duration (if available in the Cue information)}. Splice PTS is frame accurate position in Audio/Video (A/V) segment expressed as Timestamp. Break Type indicates start or end of an Advertisement Break. Media Index is segment number in the variant playlist, where change was noticed. Duration is not always available more so for Live input streams, for example, {0x12345678, begin, 48}, {0x5aibaba, end, 53}, which means advertisement break started at splice PTS of 0x12345678 in segment 48, ended at 0x5aibaba in segment 53. Media index and PTS values are maintained cross-referenceable across playlist variants.

The Boundary Annealer and Segmenter further, re-encodes a portion of content via the Annealer when the content-advertisement boundary is in within a segment and serves them separately, and the Segmenter chops detected input advertisement segments into fixed size smaller duration chunks, store them in the Segment Store, this chopping helps during advertisement replacement, as every chopped segment could be a replacement advertisement. The Segment Store has chopped input advertisement segment by the Boundary Annealer and Segmenter, these segments shall be part of output playlist CIP, replacement advertisement will be served instead of these segments or will be served as is if no replacement is available. The Playlist Builder builds a playlist with periodic redirection to the User Tracker Server (UTS), a subsystem of the ARS called Beacon redirections, and redirections to the Replacement Content Server (RCS), a subsystem of the ARS called as ServeAd redirections along with Content Segments. The Playlist Builder adds ServeAd redirections only during advertisement break, said ServeAd redirections carry chopped input advertisement segments stored in the Segment Store as URL parameters. The CIP includes discontinuity markers before and after every ServeAd redirection, Playlist is represented by CIP. The Playlist Server serves the CIP built by the Playlist Builder to all users, said Playlist Server is a typical HTTP server configured for the SSAI.

The Common Instrumented Playlist (CIP) is communication between users (represented by their device) and the ADPI, built by the Playlist Builder. CIP comprises of Content Segments, Beacon redirections, ServeAd redirections only during advertisement break. The Playlist Builder includes discontinuity markers before and after every ServeAd redirections in the CIP. The users play the CIP and thus periodically reach out to the UTS due to the Beacon redirections in the CIP, this helps the UTS to track every user. Beacon redirections have redirection URL as a parameter, the UTS redirects the user back to this URL after marking his presence. The users while playing the CIP and reach out to the RCS during advertisement break. The RCS redirects the users to replacement advertisement(s) or input chopped advertisement segment(s) stored in the Segment Store.

The ARS receives information from the ADPI in the format {Splice PTS, Break Type, Media Index, duration (if stated in Cue information)}. Splice PTS is frame accurate position in Audio/Video (A/V) segment expressed as Timestamp, Break Type indicates start or end of an Advertisement Break, Media Index is segment number in a variant playlist, where change was noticed, the duration is not always available more so for Live input streams. The media index and PTS values are same and can be cross-referenced across variants, said message format might look similar to communication between the Cue Detector and Break Aggregator, this is because of the Break Aggregator aggregates break. These aggregated breaks are communicated to the ARS by the Playlist Builder. The Load Switch, actively commands the Playlist Builder to stop inserting Beacons and ServeAds into the playlist when the ARS is overloaded and instructs the Playlist Builder to start insertion of ServeAds and Beacons again when the load is reduced or when the ARS is scaled to handle a higher load.

The system further comprising Re-timestamping on the Fly having a Stream Playout, an adaptive input stream, an Advertisement Detector and Playlist Instrumenter (ADPI), Common Instrumented Playlist (CIP), Content Segments, Beacon redirections, Advertisement Break position and duration, ServeAd redirections, Consumer Electronics (CE) devices, an Advertisement Replacement System (ARS), an Advertisement Server, Fetching Advertisements, Report Quartiles, a Load Switch, a Re-timestamp on the Fly module (RTF), re-timestamp request, Re-timestamped advertisement segments and Third parties. The SSAI publishes two different CIP playlist(s), CIP to support non-TBD devices and CIP as usual for TBD supporting devices, and the Common Instrumented Playlist CIP (Non-TBD) removes discontinuity tags in the playlist so that the Player is informed that the content is continuous in time order. For every advertisement segment URL in the CIP, PTS-2-RTS (PTS to Re-Time-Stamp) is added as URL parameter, the PTS value is the start PTS of the corresponding input advertisement segment detected. The ADPI is enhanced to publish two different CIP(s), the CIP to cater to all devices supporting in-stream discontinuity indicator in the playlist(s) and the CIP to support devices which do not support discontinuity in the playlist.

The ARS needs a small enhancement, when the ARS receives the ServeAd redirections with PTS-2-RTS parameter as per the CIP, said ARS retrieves the replacement advertisement and re-timestamps advertisement segment before serving to the user with the help of the Re-timestamp on the Fly module (RTF), and the ARS redirects the replacement URL to the RTF to re-timestamp replaced advertisement segments and served. The Re-timestamp on the Fly module (RTF) re-timestamps the replacement segment received from the ARS as per PTS-2-RTS parameter and serves to the user. The Beacon redirections are same as the Beacon redirections, there is no impact on user tracking behavior, because of the re-timestamping. The ServeAd redirections in the CIP non-TBD continue to redirect to the ARS. The Re-timestamped advertisement segments are re-timestamped advertisement segment as per PTS-2-RTS URL for which the request to re-timestamp is received. The third parties like Stream Playout produce adaptive input stream, and the Advertisement Server serves advertisements when requested by ARS.

A scalable, multi-platform, seamless Server-side Ad-Insertion (SSAI) method with a single stream input and output having Stream Playout, a Stream Receiver, Parser and Decoder, a plurality of users, a Cue Detector, a Break Aggregator, a Boundary Annealer and Segmenter, a Segment Store, a Playlist Builder and Server, a Load Switch, a User Tracker Server (UTS), a Replacement Advertisement Builder (RAB), an Advertisement Transcoder, a Replacement Content Server (RCS), an Advertisement Server, and a Quartile Reporter, comprising the steps of. Advertisement Detection and Playlist Instrumentation (ADPI). Starting the process with the Stream Receiver, Parser, and Decoder taking an authenticated input stream from the Stream Playout. Handling authentication and authorization schemes as applicable by the Stream Receiver and passing over a playlist variant stream to the Parser for parsing and downloading each segment. Decrypting the content by the Decoder if the adaptive input stream is DRM protected. Receiving the stream segment along with header information by the Cue Detector and looking for advertisement cues in headers or in Content Segments and passing the cue information to the Break Aggregator for conveying the break information in the following format, {Splice PTS, Break Type, Media Index, duration (optional, if stated in Cue information). Splice PTS indicates precise Presentation Time Stamp (PTS) where content is switched to an advertisement, the PTS is a reference to audio and video frame where the content has stopped, and an advertisement started. Break Type indicates start or end of an Advertisement Break. Media Index is segment number in a variant playlist, where change was noticed. Duration is not always available more so for Live input streams, for example, {0x12345678, begin, 48}, {0x5aibaba, end, 53} which means advertisement break started at splice PTS of 0x12345678 in segment #48, ended at 0x5aibaba in segment 53. Media index, PTS values are maintained cross-referenceable across playlist variants.

Aggregating smaller breaks into larger breaks by the Break Aggregator to facilitate larger choice for a replacement, also breaking very large advertisement breaks into reasonable size chunks typically a multiple of 5 seconds, often 5, 10, 15, 20 or 30 seconds. Re-encoding a portion of the content by the Boundary Annealer in the Boundary Annealer and Segmenter when the content-advertisement boundary is within a segment and serving them separately. Chopping media segments into smaller chunks by a Segmenter present within the Boundary Annealer and Segmenter and storing them in the Segment Store and serving, thus imparting higher flexibility during advertisement replacement. The Playlist Builder and Server builds output playlist with periodic redirections to the UTS called Beacons, these are used to track users, said output playlist also includes redirections to the RCS only during advertisement break with URL parameters referring to chopped input advertisement which are stored in the Segment Store called ServeAd redirections.

Advertisement Replacement (ARS) further comprising the steps of, playing the output playlist by the end-users in playing devices, said output playlist comprises periodic redirections in the form of Beacon redirections which is utilized by the User Tracker Server (UTS) for tracking users and ServeAd redirections that helps the Replacement Content Server (RCS) for replacing advertisement segments where the output playlist is the communication between the users and the ADPI, conveying the Advertisement Break position and duration every time to the Replacement Advertisement Builder (RAB) by the Playlist Builder and Server, the format is like that between the Cue Detector and Break Aggregator, communicating the aggregated breaks to the Advertisement Replacement System (RCS) by the Playlist Builder and Server, receiving a list of active users by the RAB from the UTS, and Fetching advertisements for all active users from the Advertisement Server, transcoding the received advertisements with the help of the Advertisement Transcoder, maintaining a mapping of replacement advertisement per active user, per detected advertisement segment in the RAB which is presented by the RCS based on the ServeAd redirections, and reporting Quartiles to the Quartile Reporter by the RCS, once replacement segment is served for downloaded advertisement segment with reporting URL, this is done for all Quartiles for all the replacement advertisements, for all breaks, and for all users. Load Balancing wherein the Load Switch commanding the Playlist Builder and Server if there is overloading in the Advertisement Replacement System (ARS), stopping to insert Beacons and ServeAds into the playlist further comprising the steps of, reconfiguring the ARS while the load is reduced or when the ARS is scaled for handling a higher load, and instructing the Playlist Builder and Server for inserting ServeAds and Beacons again.

In the method, for tracking users, the users playing the CIP which is the output of the ADPI, said ADPI inserts periodic redirections called Beacons in the playlist for the User Tracker Server (UTS) which is part of a subsystem of the ARS. Beacons redirect the users to the UTS. The UTS identifies the users based on IP Address, Cookie, User-Agent, Stream-Id parameters and sets Cookie, if supported by the CIP. The UTS redirects the user back to the Content Segment post tracking activity. The Player Application downloads segment stores Cookie if supported and plays segment. With the help of periodic and repeating Beacon redirections, the UTS always know active users playing the CIP.

For load balancing, User Tracker Server (UTS) always knows active users which the ARS is catering to when the ARS has exceeded profiled capacity, the UTS instructs the Playlist Builder to stop inserting Beacons and ServeAds into output playlist CIP. When the Playlist Server stops inserting Beacons and ServeAd into output playlist CIP, that makes the CIP equivalent to an input stream, thus the SSAI becomes a simple pass-through. Re-configuration to downscale or upscale the ARS to meet changing traffic conditions is done to handle the sudden change in the demand subsequently. Once reconfiguration is done, UTS instructs Playlist Builder to start insertion of Beacon and ServeAds as in. This process continues as per change in Traffic patterns perpetually as shown by.

For ServeAd, the users represented by Player Applications play the CIP which is an output of the ADPI. The ADPI inserts redirections to the Replacement Content Server (RCS) which is a sub-system of the ARS, for a duration of each advertisement break, detected for every chopped input advertisement segment. The RCS serves replacement advertisement such that message sequence between the Player Application, RCS and RAB include, HTTP GET request from the Player is responded with HTTP 3XX response redirecting the Player to either replacement advertisement segment or chopped input advertisement segment, the Player continues to send GET requests as per the CIP, which lasts until the advertisement break ends, the RCS retrieves usersId for user either Cookie or based on IP or User-Agent, said RCS subsequently tries to get replaced advertisement segment from the RAB, the RAB checks if advertisement is fetched for this user, in case it is, the RAB sends back replacement advertisement segment to the RCS else sends back empty response, the users may not be served replacement advertisement as the user has just joined and hence no advertisement was fetched for him, or the Advertisement Server does not have advertisements when the ARS requests for a given user. Based on the RAB's response the RCS redirects the user to replacement advertisement segment or chopped input advertisement segment. The Player Application will download and play replaced advertisement or a chopped input advertisement segment based on the response of the RCS. This entire process continues for every advertisement break as in, while the user is playing the CIP which is the output of the SSAI, the Player Application does not know about this arrangement and does not need any change.

Re-timestamps on the fly further comprising the steps of, user represented by Player Applications playing the CIP non-TBD as delivered by the ADPI, the CIP hosts ServeAd redirections for entire advertisement duration, these ServeAd segment URLs carry PTS-2-RTS parameter in addition to existing parameters like chopped input advertisement segment URL, the ARS retrieves replacement advertisement segment for users. The ARS redirects request to the Re-timestamp on the Fly module (RTF), said RTF downloads received URL, re-timestamps, and uploads to storage location. Re-timestamp on the Fly module redirects the user subsequently to a re-timestamped segment, the users (represented by the Player Application) subsequently downloads and play segment received. The re-timestamping process needs to be repeated for every advertisement break, every segment to ensure playback on devices not supporting TBD.

BRIEF DESCRIPTION OF THE DRAWINGS

FIG. 4d illustrates one variant of the input and output of the ADPI.

DETAILED DESCRIPTION OF PREFERRED EMBODIMENTS

Figure 1A:
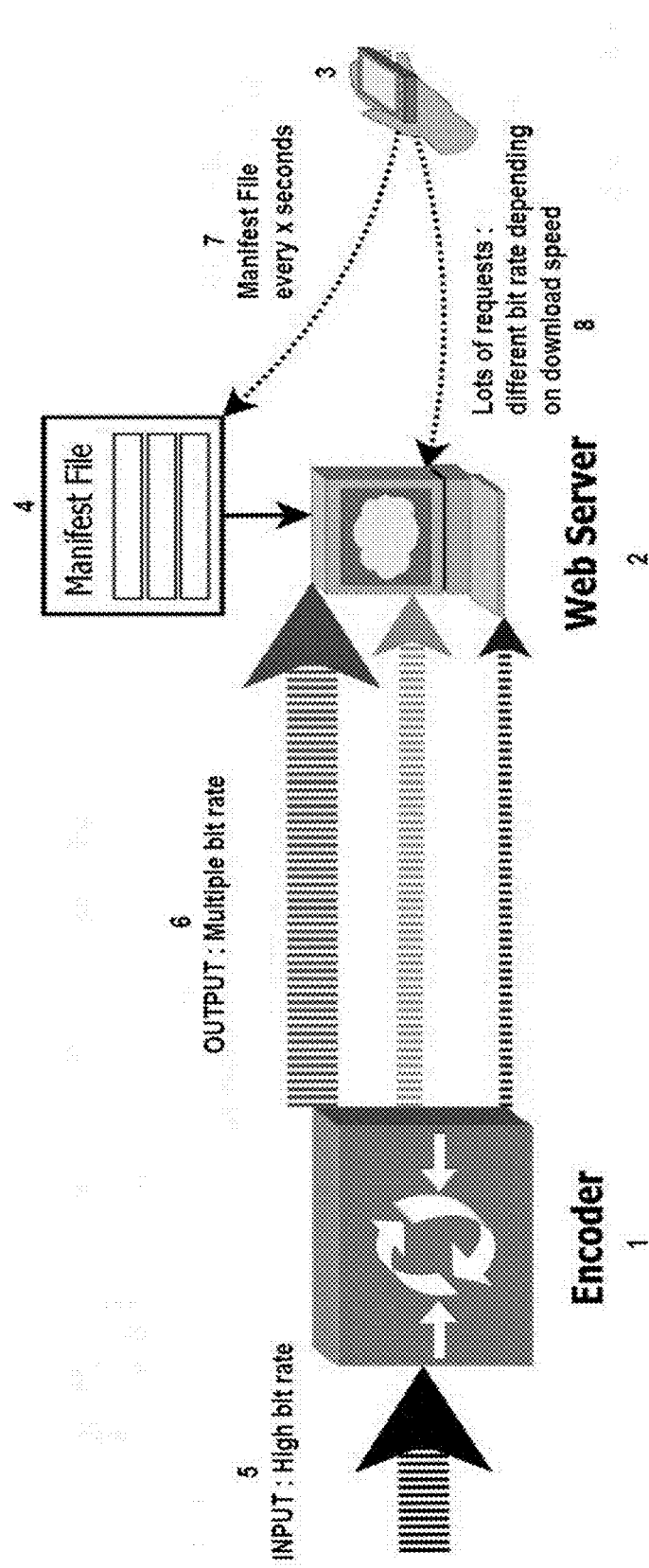
FIG. 1a illustrates Adaptive Streaming.

FIG. 1a shows Adaptive Streaming having an encoder 1, a web server 2, and a streaming client 3. Adaptive bitrate stream 6 is generated by making multiple copies of different quality from a high-quality input stream 5. The encoder 1 chunks every variant into smaller files called segments, playback sequence of these, and references to those segments are served to a player by a file called a manifest file 4. Typically, every stream copy 6 has different bandwidth and resolution which means it will take different internet speeds to play continuously and will be suitable for different screen resolutions. These are called variants of the input stream. All variant input streams (adaptive bitrate stream) have to be continuous and synchronized in time to ensure that Playback application(s) such as a Mobile Phone application can switch playback seamlessly across streams during the playback. The Player 3 fetches manifest periodically to obtain the next set segments to play 7. The Player 3 may request any of the variants 6 based on the download speed 8.

A Client-side Ad-insertion (CSAI) is a relatively simple system in which the advertisement insertion is done for a single user, unlike a Server-side Ad-insertion (SSAI).

Figure 1B:
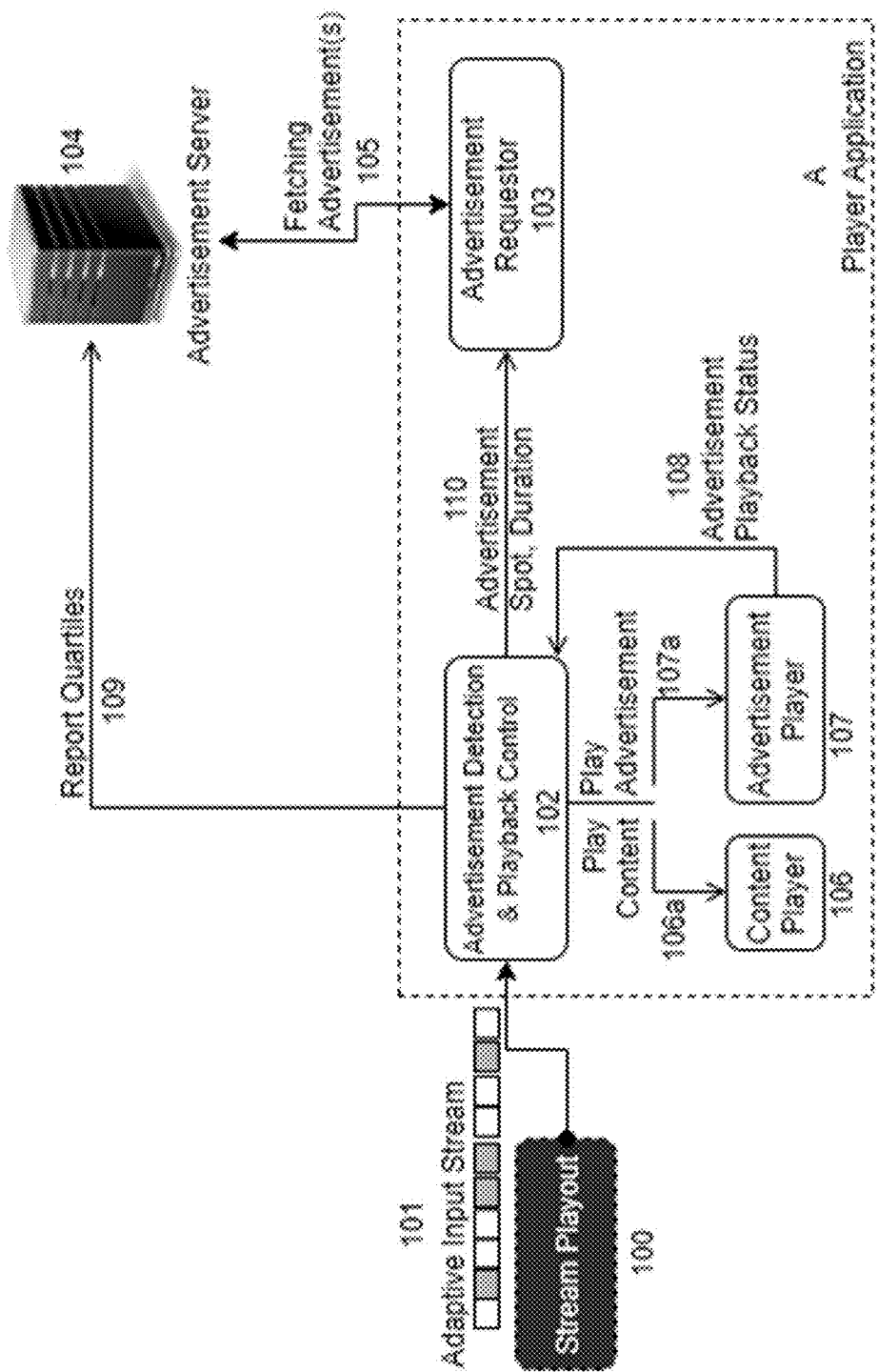
FIG. 1b illustrates a Client-side Ad-insertion (CSAI) system.

FIG. 1b shows a Client-side Ad-insertion (CSAI) system. Adaptive input stream 101 is as received from a Content Broadcaster 100 and is input to the CSAI system. Adaptive Detection and Playback Control (ADPC) 102 receives the adaptive input stream 101 decorated with advertisement cues or markers. Each cue includes the position and duration of an advertisement break 110 and is served slightly ahead of time of the advertisement. Such markers are added in every variant stream of the input. The markers are delivered either in-stream or as metadata along with the stream or as header information in a variant playlist. Whenever a marker is found, the ADPC 102 commands an Advertisement Requester 103 to find an advertisement to be played for the detected cue. The Advertisement Requester 103 receives requests to fetch advertisements for a given advertisement break. The Advertisement Requester 103 requests advertisements from an Advertisement Server 104. If found, said Advertisement Requester 103 returns location (URL) of advertisement, duration of an advertisement, reporting URLs back to the ADPC 102. Communication between the Advertisement Requester 103 and Advertisement Server 104 is covered as Fetching advertisements 105. The Fetching advertisements 105 is such that the Advertisement Requester 103 communicates with the Advertisement Server 104 honoring VAST standard. This includes a VAST Request (IP address of Player, duration of the cue, type of advertisement requested-video) to the Advertisement Server 104. The Advertisement Server 104 responds with a VAST Response (advertisement details (Location URL, duration formats available), playback reporting URLs).

In case, the Advertisement Requester 103 does not find the advertisement, the ADPC 102 shall continue stream playback 106a via the Content Player 106, uninterrupted. If the Advertisement Requester 103 discovers the advertisement, then the ADPC 102 stops the Content Player 106 and commands an Advertisement Player 107 to play an advertisement 107a. The Advertisement Player 107 notifies the ADPC 102 about the periodic progress of the playback 108. Message flow between players, between the ADPC 102 and the Advertisement Requester 103 is typical control flow and is not explained here. The ADPC 102 must report 109 on the advertisement playback progress and success back to the Advertisement Server 104. This reporting is vital for computing advertisement revenue. The Advertisement Server 104 must be notified periodically about the advertisement playback status in the form of advertisement playback reporting 109. This is done in multiples of 25% of advertisement duration hence called Quartile Reporting. The ADPC 102 sends HTTP request to Reporting URLs to the Advertisement Server 104 to which acknowledgment is sent from the Advertisement Server 104. Reporting URLs are received as part of the Fetch advertisements 105. The ADPC 102, Advertisement Requestor 103, Content Player 106, and Advertisement Player 107 forms a Player Application A.

The Player Application A is served with content stream laden with advertisement markers. These markers define the ad-begins and ad-end positions in-stream. The ADPC 102 launches the Content Player 106 and starts stream playback. Periodically, the ADPC 102 detects in-stream advertisements and informs the Advertisement Requester 103 to fetch ads for advertisement spot 110. The Advertisement Requester 103 fetches advertisements from the Advertisement Server 104. If the Advertisement Requester 103 is successful in fetching advertisements 105, the ADPC 102 pauses the Content Player 106 and plays the advertisement 107a. The Advertisement Player 107 notifies the ADPC 102 about the playback status 108. The ADPC 102 reports advertisement playback progress back to the Advertisement Server 104 for the advertisements played. This is reported in multiples of 25% of the advertisement duration and hence called Quartile Reporting 109. The ADPC 102 resumes the Content Player 106. In case an adblocker is installed, advertisement fetching 105 by the Advertisement Requester 103 fails, and the Content Player 106 plays back stream uninterrupted. Since advertisements and content are played from different sources, have different stream quality attributes, at times this method results in buffering or visible quality mismatch. The adblocker also can block the reporting of the ADPC 102 to the Advertisement Server 104 mentioned above, causing revenue loss even if the advertisement has played. The CSAI is still quite common and used typically in players like YouTube, HotStar, etc.

Figure 1C:
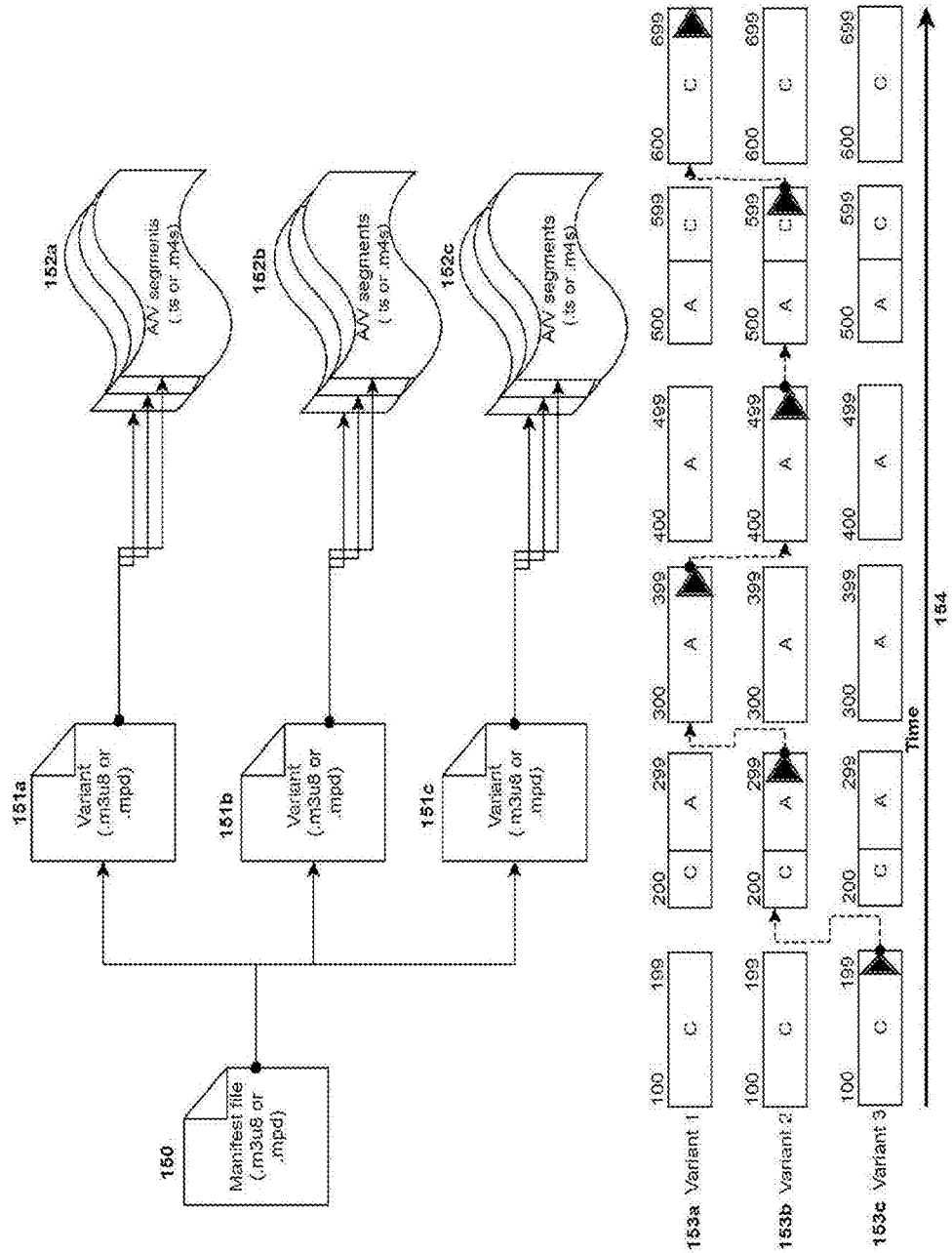
FIG. 1c illustrates pictorial demonstration of manifest and variants.

FIG. 1c demonstrates terms like manifest, variants pictorially. A player may switch variants across the variants based on the available bandwidth and continue playback. This is facilitated since variants are time synchronized.

Adaptive streaming protocols further support discontinuity of Audio-Video (A/V) quality, time order in-stream. This is to facilitate content insertion into a stream. For example, advertisement insertion into a stream, or localization of streams for certain geographies. These are called discontinuities. Discontinuities in HTTP Live Streaming (HLS) are called discontinuity tags (EXT-X-DISCONTINUITY), in Mpeg-Dynamic Adaptive Streaming (DASH) those are Periods [24].

Adaptive bitrate stream carries multiple variants 153a, 153b, 153c of content, each variant tailored to suit different audio quality, video quality and screen size. Each variant 151a, 151b, 151c also has content served in chunks or segments 152a, 152b, 152c of Audio and video. A variant is a text file called a manifest or a playlist 150 explaining location, order and quality details of content chunks. Sometimes the list of variants is served as a separate manifest file with location and attributes of variants (e.g., HLS format). At times it is served along with variant details in a single manifest (e.g., Mpeg-DASH format). All these variants are synchronized in time 154. Each variant 153a, 153b, 153c has different internet bandwidth requirements as well. This means the player may switch from one variant to another based on available internet bandwidth then and continue playback seamlessly.

Unlike CSAI, the SSAI inserts or replaces advertisements for all active users. This in-turn means that the SSAI must identify and track active users running stream and request advertisement for all the active users like the Fetch advertisements 105. The SSAI also must reports Quartiles like 109 on behalf of all the users when an advertisement is downloaded. SSAI solutions would not know when the Player Application has played the advertisement.

Figure 2:
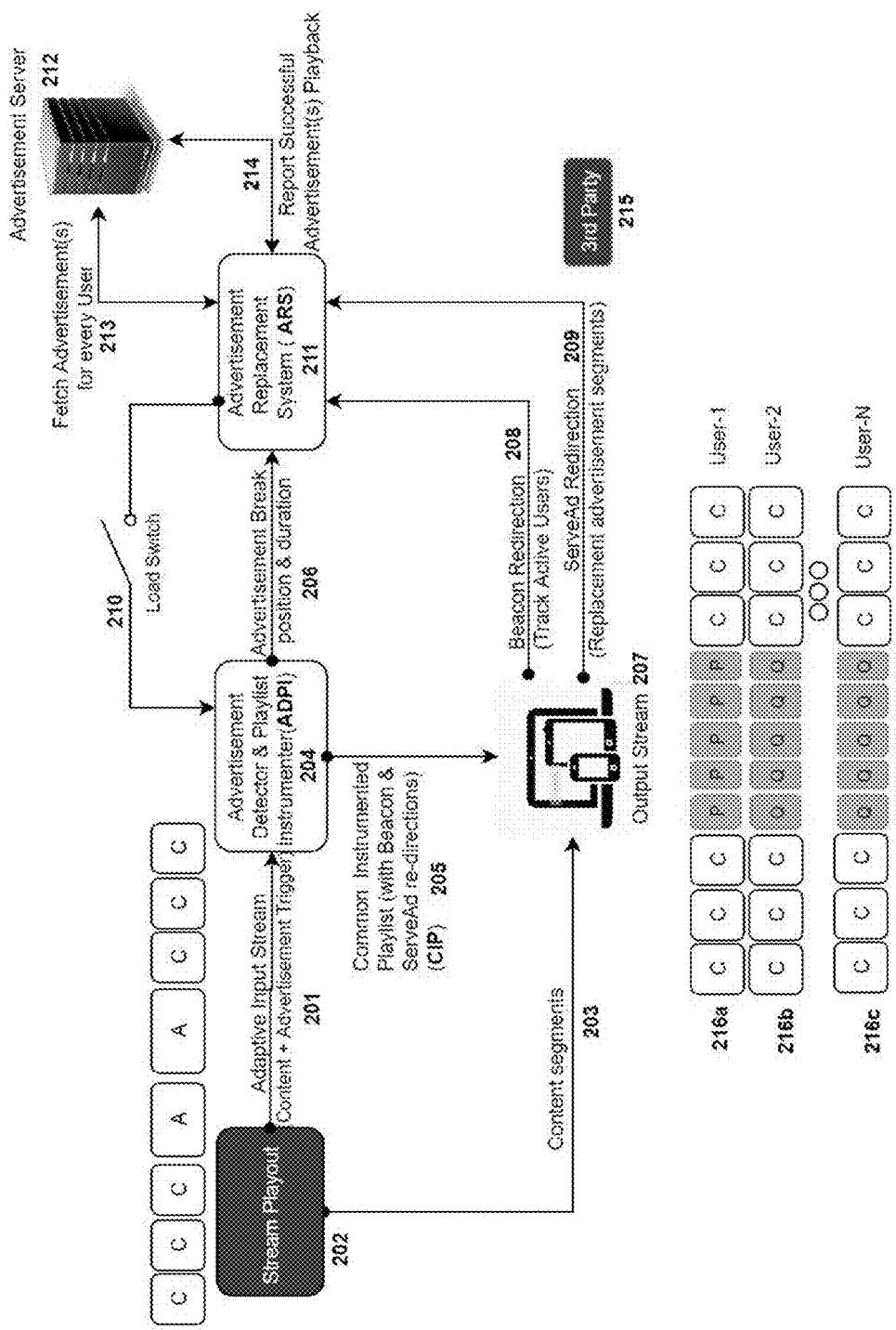
FIG. 2 illustrates a Server-side Ad-insertion (SSAI) system.

FIG. 2 describes the proposed SSAI solution. An adaptive input stream 201 from a Stream Playout 202 which is the Adaptive bitrate stream. An Advertisement Detector and Playlist Instrumenter (ADPI) 204 can be viewed as an enhanced ADPC 102 to meet the SSAI expectations. The ADPI 204 looks for different types of advertisement cues in input manifest and Content Segments 203. Detected cues are sent to an Advertisement Replacement System (ARS) 211, covered as an Advertisement Break position and duration 206. The ADPI 204 also delivers output playlist which is played by all end-users, defined as Common Instrumented Playlist (CIP) 205. The output playlist contains Beacon redirections 208 to the ARS 211 for tracking active users and redirections to said ARS 211 for every segment of detected advertisement called ServeAd redirections 209. The ServeAd redirections 209 facilitates serving different advertisements per user.

The Common Instrumented Playlist (CIP) 205 is about communication between end-users and the ADPI 204. All users (devices) 207 play the CIP 205 once the SSAI is deployed. The CIP 205 contains a list of URLs which includes content URLs, Beacon redirections 208 and ServeAd redirections 209. The Beacon redirections 208 are added periodically in the CIP 205 so that the users often reach out to the ARS 211 to mark their presence. The ARS 211 thus knows active users all the time and can Fetch advertisements 213 for them. When playback devices 207 reach out to the ARS 211 during the ServeAd redirections 209, said ARS 211 serves them the Fetched advertisements 213.

Content Segments 203 are segments which are not modified by the SSAI, and thus user's player shall fetch them directly from the Stream Playout 202. The Beacon redirections 208 are periodic redirections added by the output playlist to the ARS 211. The ARS 211 can track users either using Cookie or Internet Protocol (IP) Address, User-Agent or by any other parameter to identify the user uniquely.

The ADPI 204 sends advertisement cue information to the ARS 211 in the form of Advertisement Break position and duration 206. The Advertisement Break position and duration 206 includes information like Media sequence, playback timestamp (PTS) in Media segment where the advertisement begins or ends, duration, and cue type.

The user's player requests advertisement segment as per the CIP 205 from the ARS 211 due to the ServeAd redirections 209. The ARS 211 redirects the player to replacement advertisement segment if an advertisement is fetched for a user, else to input advertisement segments. The ARS 211 tracks the active users, Fetches advertisements 213 for every active user and serves replacement for all such users.

The ARS 211 also reports Quartiles 214 for all users and all breaks, once the segment is downloaded by the user's player. The ARS 211 caters to multiple input streams, i.e., multiple ADPI 204 instances. Fetching advertisements 213 is obtaining the advertisements from an Advertisement Server 212 by the ARS 211. The Fetch advertisements 105 in the CSAI does this for a single user, whereas the SSAI needs to fetch advertisements for all active users. The ARS 211 sends advertisement request to the Advertisement Server 212 for each active user. Request parameters sent to the Advertisement Server 212 includes duration requested, IP address of a user, User-Agent, Cookie (if applicable) representing the user request sent for. For each active user, a successful response from the Advertisement Server 212 includes advertisement details (Location URL, duration, formats available, playback reporting URLs). A response may be empty or may have a mismatch with requested duration. Advertisement Playback Reporting 214 is about reporting Quartiles from the ARS 211 to the Advertisement Server 212 for all active users. The Report Quartiles 109 in the CSAI does this for a single user, whereas the SSAI needs to do this for all active users. Protocol details are same as in Report Quartiles 109 of the CSAI.

The ARS 211 tracks active users, fetch advertisements for all users and serves them. Moreover, the ARS 211 does it for multiple input streams, i.e., the ADPI 204 instances. The ARS 211 needs to scale up and down based on the number of users. During said scaling process, the ARS 211 cannot serve the replacements or track users. When the ARS 211 starts scaling, it sends a signal to the ADPI 204 asking the ADPI 204 not to add the Beacons 208 or ServeAds redirections 209 in the CIP 205 for the duration of scaling. Post scaling, the ARS 211 informs the ADPI 204 to start adding redirections again. This is depicted as Load Switch 210.

Output stream 207 is such that the SSAI proposed here detects advertisements in the adaptive input stream 201, the ADPI 204 chops detected advertisements into constant duration segments and inserts them in the CIP in place of replaces them with available duration. This gives the flexibility to replace any detected advertisement with any combination of replaced advertisements. For example, consider an adaptive input stream that has two advertisement segments with 12 and 13 seconds each. The ADPI 204 chops them into five segments of 5 seconds each. The ARS 211 may replace them with any multiple of 5 seconds duration advertisements for a particular user. For example, User-1 {5, 10, 10} 216a, User-2 {5, 5, 5, 5, 5} 216b, User-4 {20, 5} 216c and so forth. Third parties 215 indicates actors are playing a role in the scheme of things, but are not part of the invention, for example, Stream Playout 202 and Advertisement Server 212.

The Advertisement Replacement System (ARS) 211 is primarily responsible for tracking active users, getting replacement advertisements for all users active and subsequently serving them, upon request from the users. The ADPI 204 only builds an instrumented playlist with redirections to sub-systems of the ARS 211 for tracking and serving advertisements, in addition to notifying about Ad-break detected to the ARS 211, its responsibility ends there. One ADPI is needed per input stream, whereas a single instance of the ARS can cater to many ADPI instances.

Figure 3A:
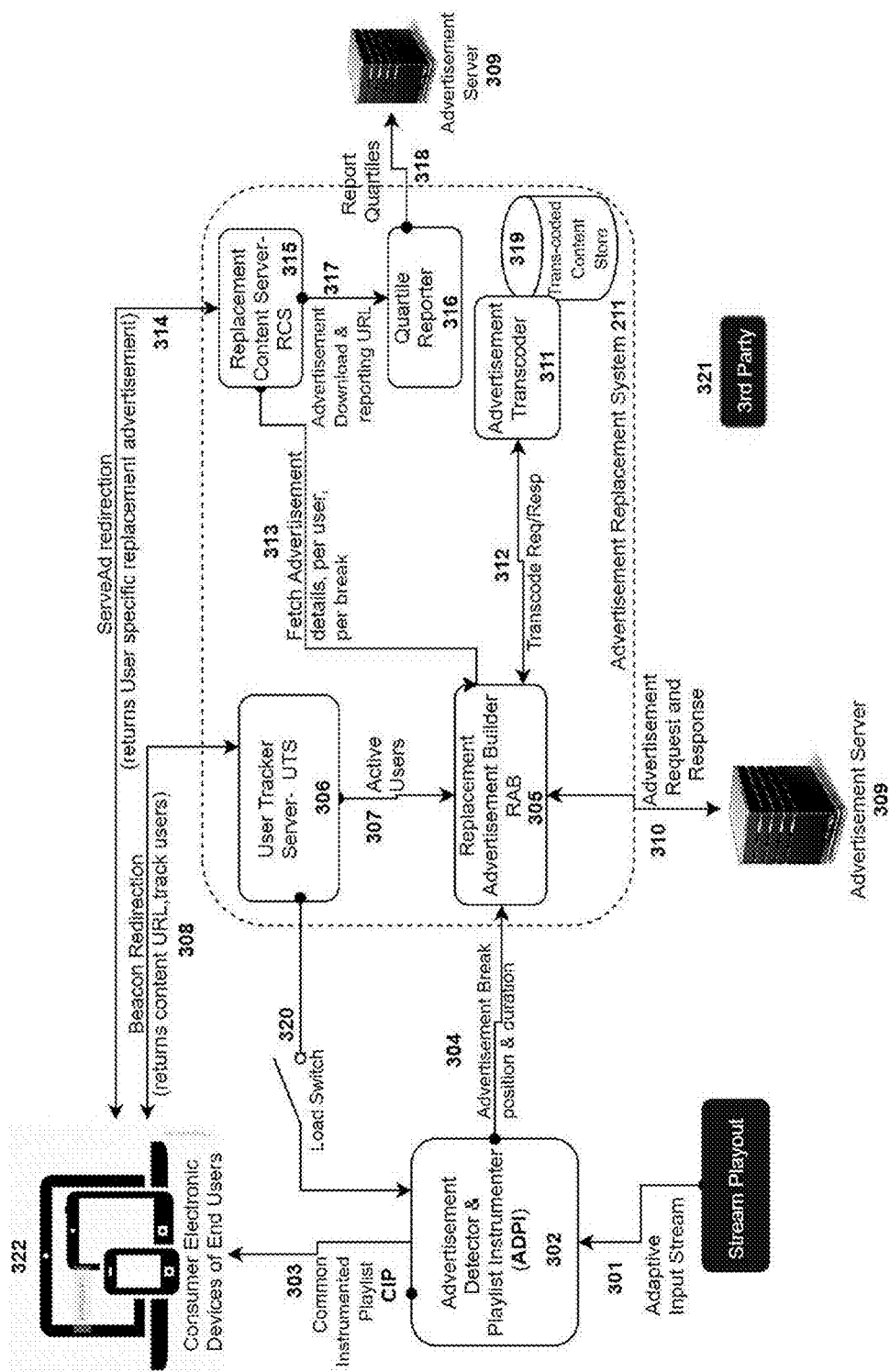
FIG. 3a illustrates dissection of an Advertisement Replacement System (ARS) with building blocks and functionality.

FIG. 3a is a dissection of the ARS for explaining building blocks and functionality. Adaptive input stream 301, Advertisement Detector and Playlist Instrumenter (ADPI) 302, Common Instrumented Playlist (CIP) 303, user's devices 322 are same as the adaptive input stream 201, the ADPI 204, CIP 205 and output stream 207 respectively.

The Replacement Advertisement Builder (RAB) 305 receives frame accurate information about detected advertisement break from the ADPI 302 in the form of Advertisement Break position and duration 304.

The message format is, {Splice PTS, Break Type, Media Index, duration (optional, if stated in Cue information)}. Splice PTS is frame accurate position in Audio/Video (A/V) segment expressed as Timestamp. Break Type indicates start or end of an Advertisement Break. Media Index is segment number in a variant playlist, where change was noticed. Duration is not always available more so for Live input streams.

For example, {0x12345678, begin, 48}, {0x5aibaba, end, 53}. This means advertisement break started at splice PTS of 0x12345678 in segment #48, ended at 0x5aibaba in segment 53. As explained earlier, the media index and PTS values are same and can be cross-referenced across variants.

The Replacement Advertisement Builder (RAB) 305 receives information about detected advertisement break 304 from the ADPI 302. The RAB 305 gets a list of active users 307 from a User Tracker Server (UTS) 306. The RAB 305 fetches advertisements for all active users, covered by Advertisement request and response 310. The RAB 305 transcodes advertisements with the help of an Advertisement Transcoder 311.

Figure 3B:
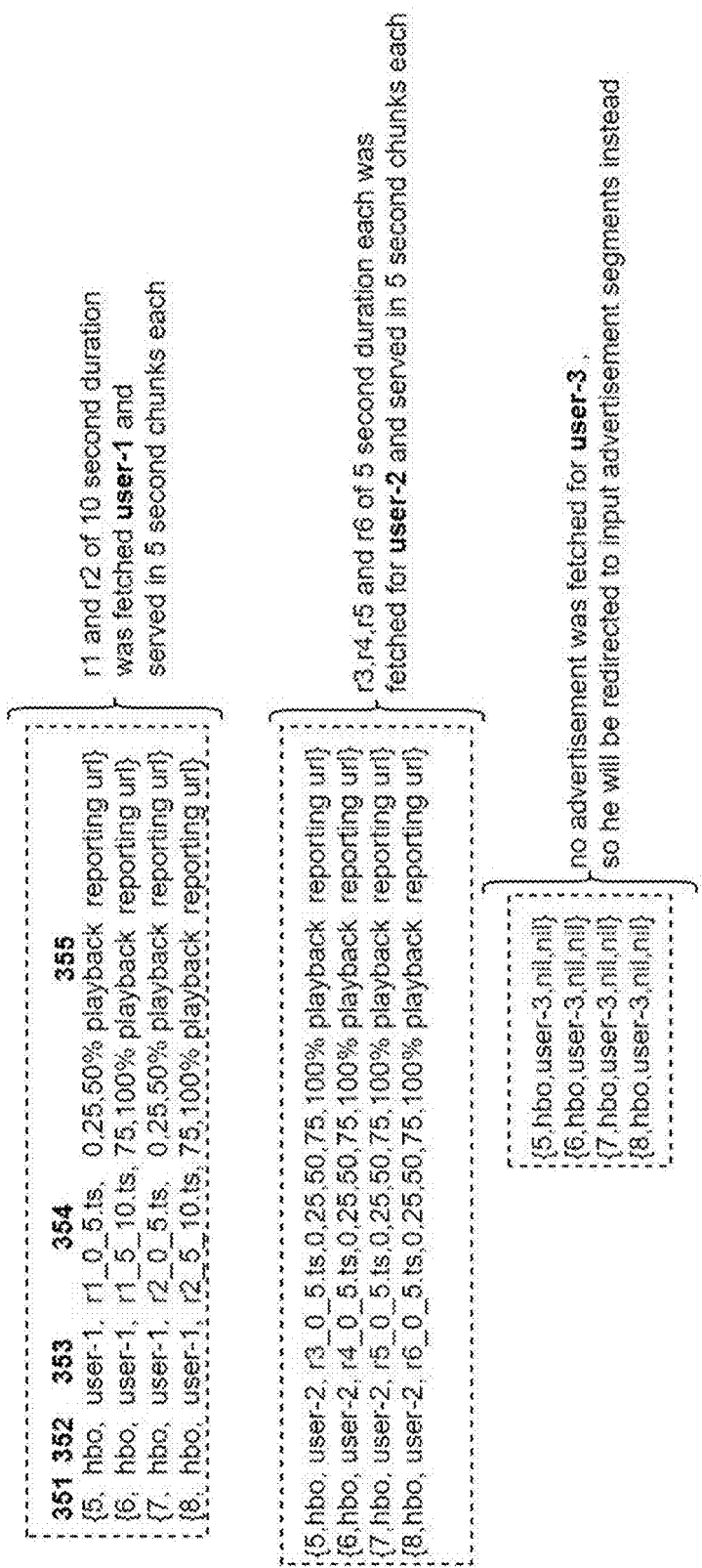
FIG. 3b illustrates a mapping format stored in a Replacement Advertisement Builder (RAB) in the ARS.

The RAB 305 maintains replacement advertisement mapping per active user, per detected advertisement segment. FIG. 3b shows a mapping format. For the CIP 303 example above, if there are three active users, here is how replacement advertisement mapping inside the RAB 305 would look like. Mapping Format is {media sequence 351, stream-Id 352, user-Id 353, replaced segment 354, reporting URLs 355}.

End-users (i.e., Devices of end-users) 322 play CIP 303 and periodically reach out to the User Tracker Server (UTS) 306 as in FIG. 3a. This is because of Beacon redirections inserted by ADPI into CIP 303. UTS tracks users uniquely based on Cookie (if supported by Player) or by User-Agent, IP and or by any other identifier like device-Id provided by Player application. The Beacon redirections 308 is communication between the UTS 306 and users 322.

Fetching advertisements 313 is such that advertisements are fetched by the RAB 305 for all the active users. Transcoding request, response 312 is such that the RAB 305 sends transcoding requests for every unique advertisement received in 310, The Advertisement Transcoder 311 transcodes advertisement in A/V format matching adaptive input stream Advertisement characteristics and stores in the Trans-coded content store 319.

The ServeAd redirections 314 is communication between the Replacement Content Server (RCS) 315 and devices of end-users 322. When the ServeAd redirections 314 reaches the RCS 315, said RCS fetches replacement mapping for a ServeAd request. Once replacement segment is served, the RCS 315 notifies the Quartile Reporter 316 to Report Quartiles 318 for downloaded advertisement segment with reporting URL 317.

The Quartile Reporter 316 does Quartile reporting once it receives advertisement segment download confirmation and reporting URL from the RCS 315. This is done for all Quartiles, for all replacement advertisements, for all breaks, and for all users.

The Advertisement Transcoder 311 does format conversion of received advertisements from the Advertisement Server 309 to match quality attributes of the adaptive input stream 301 of the Stream Playout 300. The Advertisement Transcoder 311 also chunks received advertisements into segments matching input advertisement segments.

FIG. 3b showed a mapping maintained in 305 when there are three active users playing the CIP 303. Advertisement Transcoder 311 would have chunked R1 into R1_0_5.ts R1_5_10.ts and R2 into R2_0_5.ts R2_5_10.ts as shown in FIG. 3b. There is no chunking required for R3, R4, R5, and R6 as they were already of 5 seconds duration. The Quartile Reporting 318 from FIG. 3a is a protocol detail for Quartile communication are same as explained in 109 of the CSAI. The ARS 211 serves replacement advertisements for all users, all streams and thus needs to re-configure to meet changing traffic demands.

Load Switch 320 is a mechanism by which the ADPI 302 is notified about re-configuration event. During this time, the ADPI 302 serves adaptive input stream as is to the end-users and does not add Beacon and ServeAd redirection. During re-configuration period, no advertisements are replaced. The ARS 211 notifies the ADPI 302 again once it is ready to handle changed traffic conditions so that the ADPI 302 can engage the ARS 211 again.

The ADPI covered receives input stream, detects advertisement breaks, concatenates back to back advertisement breaks, segments advertisement break into smaller size A/V chunks, delivers instrumented playlist CIP to the end-users with Beacon and ServeAd redirection. The ADPI stops adding Beacon and ServeAd redirections in the case, the ARS has reached its advertisement serving limits when notified via the Load Switch. The ADPI may be seen as a proxy between the input streams and end-users.

Figure 4A:
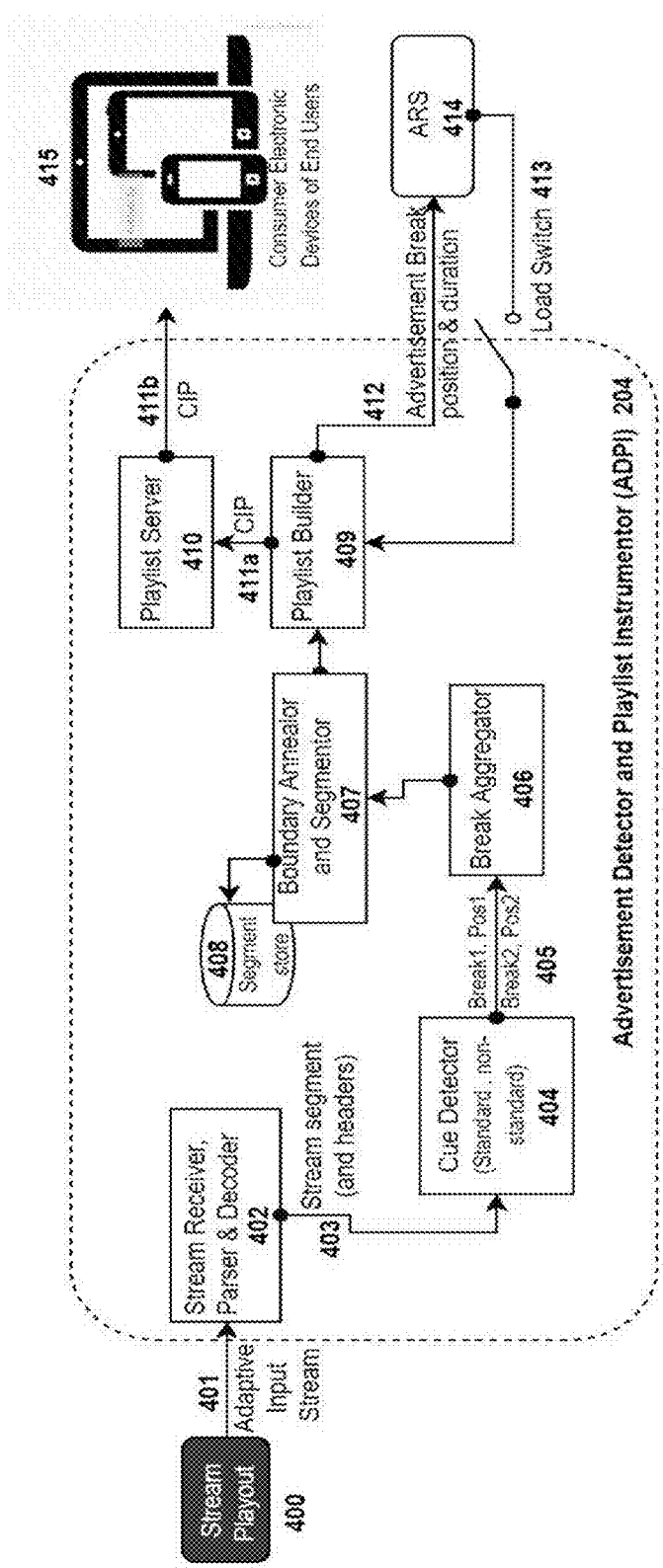
FIG. 4a illustrates dissection of an Advertisement Detector and Playlist Instrumenter (ADPI) for detailing out functionality and job scope.

FIG. 4a is a dissection of the ADPI 204 for detailing functionality. Adaptive input stream 401 from the Stream Playout 400 is the same as the adaptive input stream 201, said input stream carries content and advertisement cues. Cue information may be blended in Audio and Video (as non-visible or audible information), or a separate metadata stream with cue information or could be in-stream manifest. Cues may be standard like SCTE35, DTMF tones or non-standard like system watermark. Stream Receiver, Parser, and Decoder 402, at which a Stream Receiver handles authentication and authorization schemes as applicable and hands over a playlist variant stream to a Parser. The Parser parses chosen playlist variant, downloads each segment, a Decoder does content decryption if the adaptive input stream 401 is DRM protected.

Cue Detector 404 receives the downloaded segment 403 along with header information in input stream variant. There are incidents when cue information is available as an encoded header in playlist variant just above segment URL which has a cue. The Cue Detector 404 shall detect cues whether it is in the header or the content. Cue information 405 is passed on to a Break Aggregator 406. Break information is conveyed in the following format, {Splice PTS, Break Type, Media Index, duration (optional, if stated in Cue information)}. Splice PTS is frame accurate position in Audio/Video (A/V) segment expressed as Timestamp. Break Type indicates start or end of an Advertisement Break. Media Index is segment number in the variant playlist, where change was noticed. Duration is not always available more so for Live input streams. For example, {0x12345678, begin, 48}, {0x5aibaba, end, 53}. This means advertisement break started at splice PTS of 0x12345678 in segment #48, ended at 0x5aibaba in segment 53. Media index, PTS values are maintained cross-referenceable across playlist variants.

Further, the Break Aggregator 406 aggregates smaller breaks into a larger break, to facilitate larger choice for a replacement, also it breaks very large advertisement breaks into reasonable size chunks. The Break Aggregator 406 applies various strategies to meet this objective. Aggregate back to back smaller breaks, for example, 10 seconds, 30 seconds, 20 seconds advertisements may be merged to form a longer 60 seconds advertisement break, replacing small content portions along with advertisements as well if seen between advertisements. For example, a small 5-seconds content in between advertisements (say weather report) may be marked for replacement along with advertisement before and after to form a longer advertisement break. Segment long breaks into smaller ones and serve back to back. For example, a 3-minutes long break may be chunked into three back to back 1-minute breaks.

The video is often encoded such that every frame object has cross-references in a previous or the next frame, this technique ensures efficient bandwidth and storage utilization. This cross-referencing of information needs to be disengaged when a portion of the content is replaced. This is where a Boundary Annealer and Segmenter 407 comes into play. Boundary Annealer re-encodes some part of the content when the content-advertisement boundary is in within a segment and serves them separately. Segmenter chops media segments into smaller chunks stores them in a segment store 408 and serves. This process imparts higher flexibility during advertisement replacement which is further demonstrated by examples below.

Figure 4B:
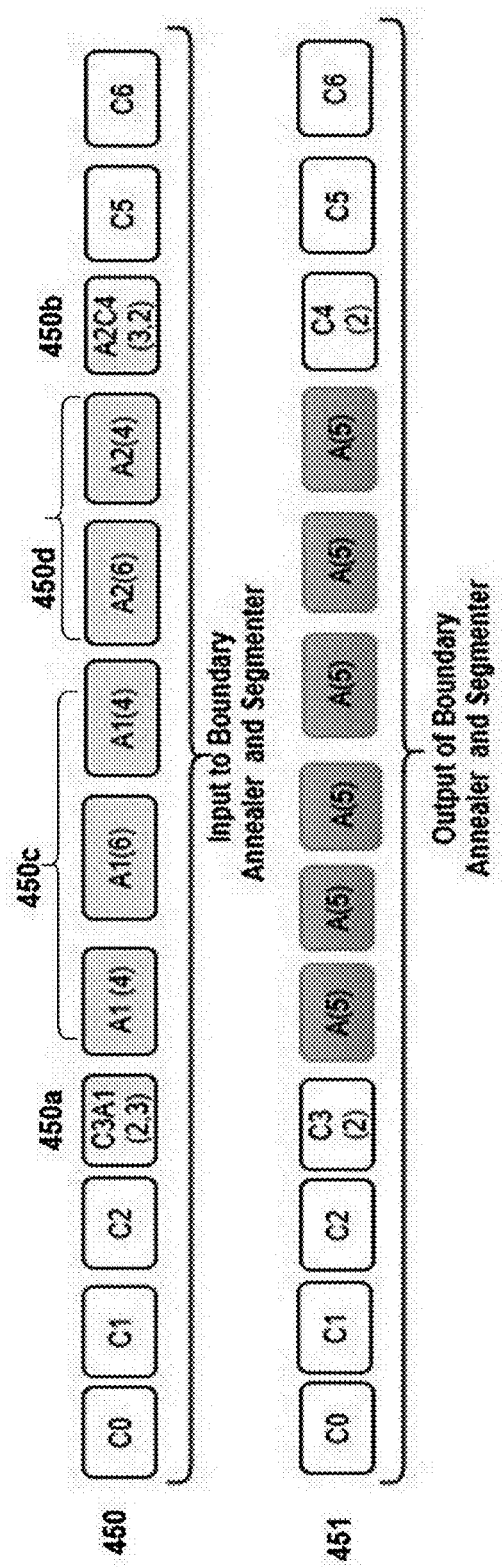
FIG. 4b illustrates input and output of a Boundary Annealer and Segmenter with content-advertisement boundary.
Figure 4C:
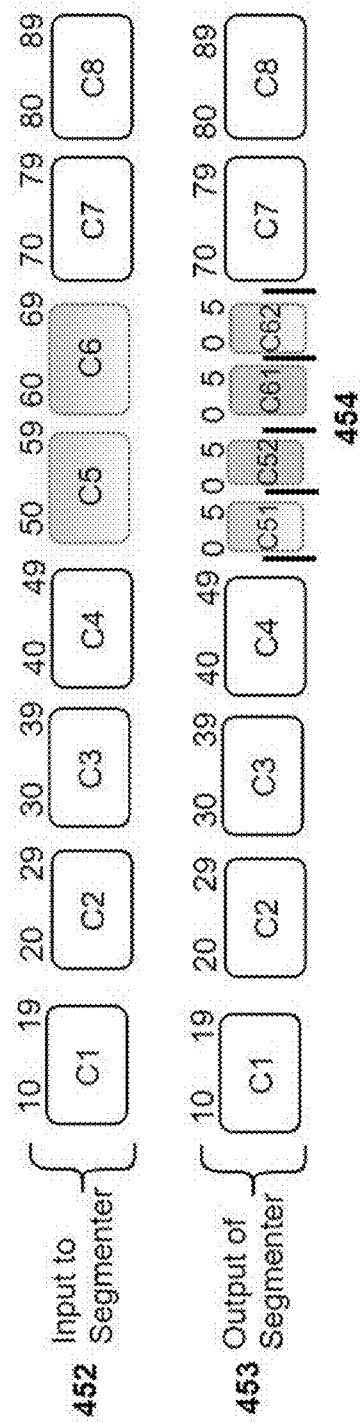
FIG. 4c illustrates input and output of the Segmenter without content-advertisement boundary.

FIG. 4b shows input 450 and output 451 of the Boundary Annealer and Segmenter 407, the Boundary Annealer has separated C3A1 450a, and A2C4 450b and the annealer has evenly chopped two input advertisements A1=17 seconds 450c, A2=13 seconds 450d into 5 seconds segments. In case the content-advertisement boundary is not in between segments like in FIG. 4b, the Boundary Annealer has no role to play. The Segmenter simply chunks input media 452 as shown in FIG. 4c delivering the output 453.

Playlist Builder 409 in FIG. 4a builds a playlist with periodic redirection to the User Tracker Server 306 (UTS), a subsystem of ARS 414 called Beacons redirections and to Replacement Content Server 315 (RCS), a subsystem of Advertisement Replacement System (ARS) 414 called as ServeAd redirection. 409 adds ServeAd redirections only during advertisement break. A Playlist is represented by the CIP 411a. Construction of the CIP 411a is explained in the respective section. Playlist Server 410 serves the CIP 411a built by the Playlist Builder 409 to all users. The Playlist Server 410 is typical off the shelf HTTP Server (e.g., nGinx or Apache httpd) configured for the SSAI. The CIP 411*b* is communication between users' devices 415 and the ADPI 204.

The Advertisement Break position and duration 412 is conveyed every time to the ARS 414 by the Playlist Builder 409. The format of 412 is same as 405 with the exception that Advertisement Break position and duration 412 is aggregated break information as produced by the Break Aggregator 406.

When the ARS 414 is overloaded, the Load Switch 413 actively commands the Playlist Builder 409 to stop inserting Beacons and ServeAds into the playlist. This time is used to reconfigure the ARS 414, when the load is reduced or when the ARS 414 is scaled to handle a higher load, the Load Switch 413 instructs the Playlist Builder 409 to start insertion of ServeAds and Beacons again.

The Advertisement Replacement System (ARS) 414 does the job of tracking active users, fetching advertisements for each one and serving them when requested by the users. The ARS 414 shown here is same as the Advertisement Replacement System (ARS) 211. The CIP 411*b* is best explained in the form of an example. The ADPI receives an adaptive input stream 401 as input, one of the variant(s) of the input is depicted below. The demonstration is conceptual, usage of HLS terminology is for illustration purpose, functionality can be supported using any Adaptive Bitrate Streaming standard.

FIG. 4*d* shows one variant of the input and output. The Playlist Builder 409 converts C3.ts 475*a* in input variant 475 into a redirection to the UTS 306 in output playlist 476, this is done periodically. This ensures Player Application on user's device reaches to the User Tracker Server 306 regularly. The UTS 306 tracks user reaching out and redirecting him to Content Segment, i.e., C3.ts 475*a*. C5 475*b* and C6 475*c* are shown as advertisements, cue to convey that C5 475*b* and C6 475*c* are advertisements that may be in the playlist as headers or in content and detected by the Cue Detector 404. The Boundary Annealer and Segmenter 407 chops C5.ts 475*b* and C6.ts 475*c* into multiple smaller segments in output playlist 476 as seg51.ts 476*b*, seg52.ts 476*c*, seg61.ts 476*d* and seg62.ts 476*e*. In place of these advertisement segments, the Playlist Builder 409 adds redirections to the RCS 315 in the CIP 411*a* and pass seg51.ts 476*b*, seg52.ts 476*c*, seg61.ts 476*d*, and seg62.ts 476*e* as parameters, along with stream-Id. The RCS 315 now may serve replacement advertisements for users or redirect them to chopped input segments with the help of Replacement Advertisement Builder (RAB) 305. Redirecting a user to chopped input segments is done if, no advertisements could be fetched for that end-user by the RAB 305. Chopping done by the Boundary Annealer and Segmenter 407 allows serving different duration advertisements to different users. For example, C5 475*b* and C6 475*c* may be of 10 seconds each but chopping and serving them as four files seg51.ts 476*b*, seg52.ts 476*c*, seg61.ts 476*d* and seg62.ts 476*e*, allows the ARS 414 to fetch and serve advertisements which are multiple of 5 seconds. Discontinuity indicator in the CIP 411*a* conveys that each of ServeAd redirections could be a different advertisement and thus may be discontinuous in time and quality.

All Consumer Electronic devices do not support playback of an adaptive stream with Discontinuity markers. Discontinuity markers are stream change indicators like a change in audio, video parameters and presentation time stamps. Discontinuity markers are exemplified by EXT-X-DISCONTINUITY in HLS or Periods [24] in Mpeg-DASH. SSAI output only supports devices supporting discontinuity indicators by default. SSAI proposed here matches advertisement quality with audio, video properties of input stream with the help of Advertisement Transcoder. The embodiment proposed ensures playback on discontinuity non-supporting devices. The embodiment does this by serving different output playlist to supporting and non-supporting devices. For discontinuity, non-supporting devices Embodiment builds a separate playlist by removing discontinuity markers in the playlist. The embodiment also re-timestamps advertisements on the fly to ensure time continuity when such a device plays back output playlist.

Figure 5A:
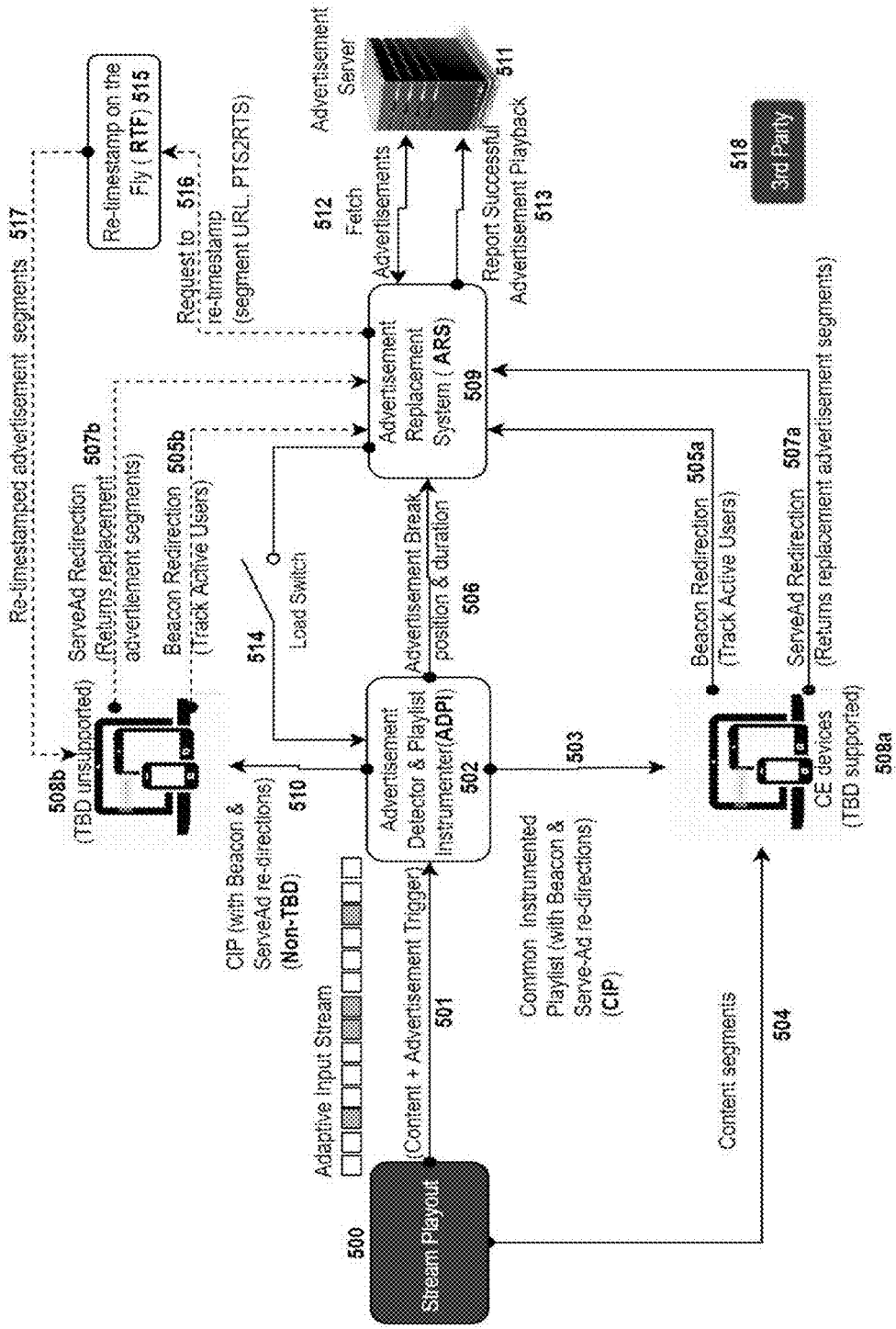
FIG. 5a illustrates the SSAI system with retime stamping on the fly.

FIG. 5*a* shows the SSAI system with retime stamping on the fly. Dotted lines in the Figure and RTF 515 represent an embodiment of the SSAI solution. The SSAI publishes two different CIP playlist(s), CIP 503 as usual for TBD supporting devices 508*a*. (i.e., Devices supporting Discontinuity indicators in a playlist) and CIP 510 to support non-TBD devices 508*b*.

Adaptive input stream 501 from a Stream Playout 500, CIP 503, Content Segments 504, Beacon redirections 505*a*, Advertisement Break position and duration 506, ServeAd redirections 507*a* and Advertisement Server 511 are just the same as an adaptive input stream 201, CIP 205, Content Segments 203, Beacon redirections 208, Advertisement Break position and duration 206, ServeAd redirections 209 and Advertisement Server 212 respectively. The supporting embodiment has had no impact on the above parts. The Advertisement Detector and Playlist Instrumenter (ADPI) 502 is enhanced to publish two different CIP(s) now, the CIP 503 and CIP 510 to cater to TBD supporting and non-supporting devices respectively.

The Advertisement Replacement System (ARS) 509 needs a small enhancement when the ARS 509 receives the ServeAd redirections 507*b* with PTS-2-RTS parameter as per the CIP 510, said ARS 509 retrieves replacement advertisement by reaching out to the Advertisement Server 511. Additionally, the ARS re-timestamps advertisement segment before serving to the end-user with the help of a Re-timestamp on the Fly module (RTF) 515. Re-timestamped advertisement segment 517 is played by TBD unsupported devices 508*b*. The Common Instrumented Playlist CIP (Non-TBD) 510 playlist has no discontinuity tags in the playlist so that the player believes stream is continuous in time order. In addition to that, for every advertisement segment URL in the CIP 510 PTS-2-RTS (PTS to Re-Time-Stamp) is added as URL parameter. The PTS value is the start PTS of the corresponding input advertisement segment detected. Subsequent sections will show a sample of CIP 510.

The Re-timestamp on the Fly module (RTF) 515 re-timestamps the replacement segment received from the ARS 509 as per PTS-2-RTS parameter and serves to the User. The Beacon redirections 505*b* are same as Beacon redirections 505*a*, there is no impact on User Tracking behavior, because of the re-timestamping. The ServeAd redirections 507*b* in the CIP non-TBD 510 continue to redirect to ARS 509. The ARS 509 redirects the replacement URL to the RTF 515 as a request to re-timestamp 516 to re-timestamp replaced advertisement segments and serve as re-timestamped advertisement segments 517. Fetching advertisements 512 from the Advertisement Server 511 and reporting quartiles 513 remains same for TBD and non-TBD devices. The Load Switch 514 behavior has not been impacted due to the introduction of the RTF 515 and continues to behave like the Load Switch 210. Third parties 518 are Stream Playout 500 and Advertisement Server 511.

Figure 5B:
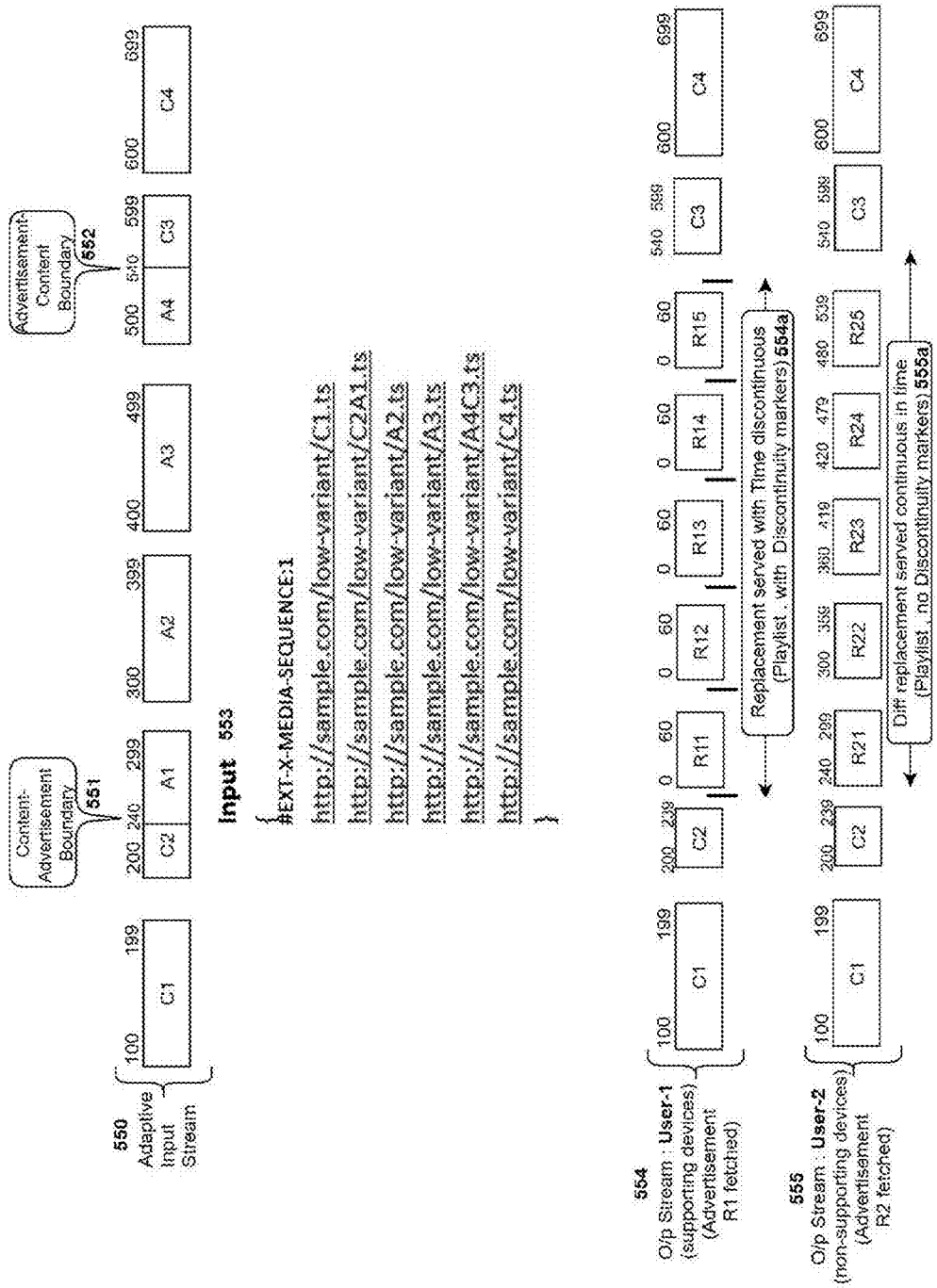
FIG. 5b illustrates an example input and output of retime stamping on the fly.

FIG. 5b shows re-time-stamping on the fly in action. Adaptive input stream 550, 553 has content-advertisement boundary 551 within a segment, the ADPI has detected breaks and chopped advertisement segments in uniform chunks. The ADPI 502 here also has delivered two Instrumented Playlist(s), CIP 503 for TBD supporting devices and CIP non-TBD 510 for non-TBD devices. Outputs 556, 557 shows how stream segments devices finally will get to play. For input stream above, A/V segments carry cue information in-stream segments. The SSAI separates advertisement and Content Segments by splicing on cue boundary. Thus, C2A1 551 and A4C3 552 are made into two chunks each. C2 and C3 are now separate segments in the output. Output section shows how SSAI intrinsic output 556 and SSAI with re-timestamping on the fly output 557 differentiate in their output playlist. Simplifying assumptions for illustration are User-1 554, playing TBD supporting devices thus playing CIP 503, User-2 555 is playing on non-TBD devices thus playing CIP 510. Output variant playlist 556 (TBD devices) is the output of the SSAI proposed as part of this invention and output variant playlist 557 (non-TBD devices) is output when embodiment has played its part. The output playlist (user-1) has EXT-X-DISCONTINUITY tag 556a, conveying discontinuity of time. The output playlist of user-2 does not have this tag 557a. This indicates that the player may assume that the timestamp is continuous across content and replaced advertisements. The ServeAd redirections in the output playlist of user-2 have an additional parameter PTS-2-RTS 557a that carries start PTS information. The ARS 509 employs the RTF 515 to re-timestamp replaced advertisement segments to match PTS as per PTS-2RTS parameter.

Figure 6:
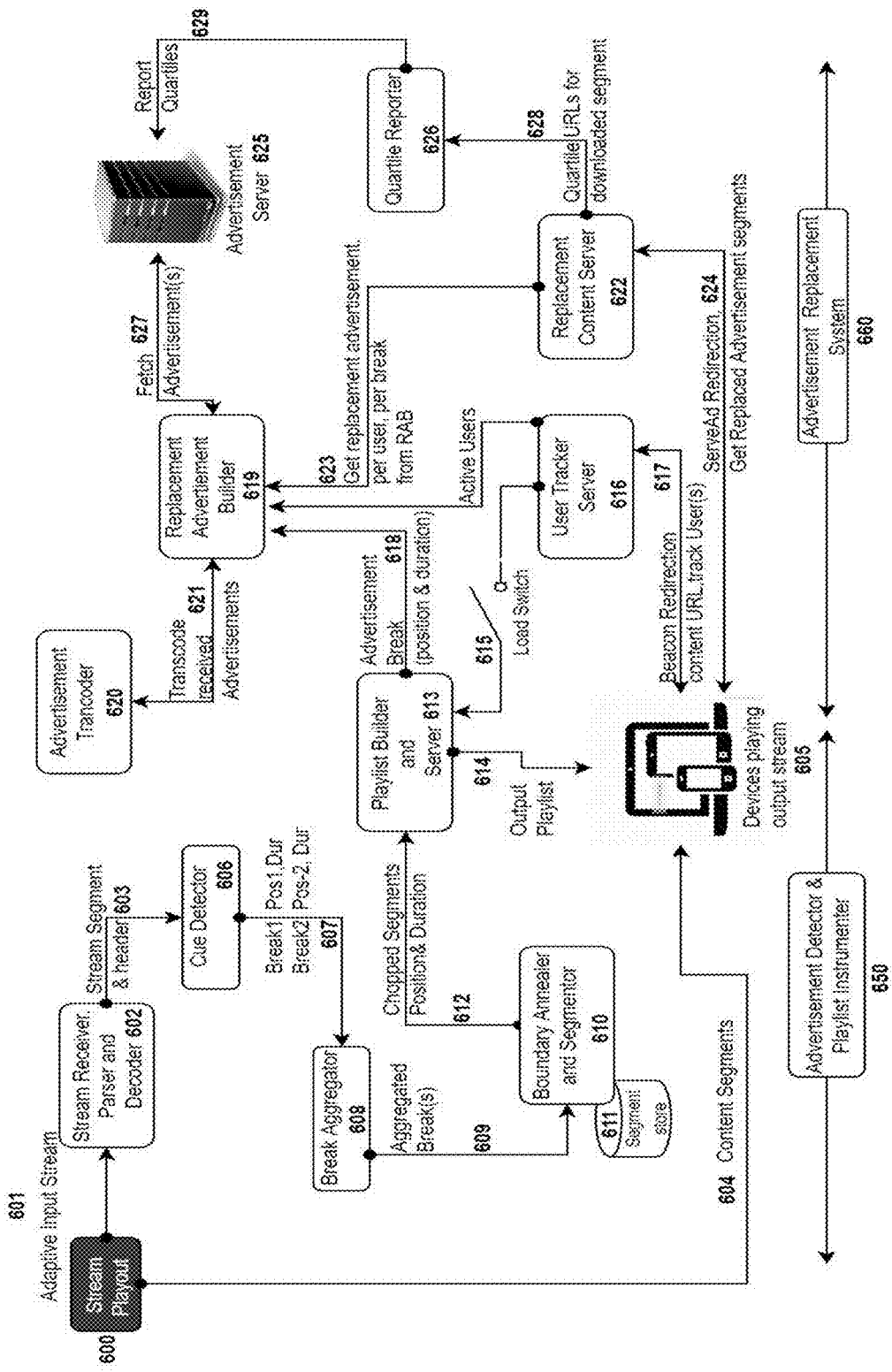
FIG. 6 illustrates an overall method showing a role of every actor in the system.

FIG. 6 illustrates overall method showing a role of every actor in the system. The SSAI ingests adaptive input stream 601, detects advertisements, tracks users, and replaces advertisements. To facilitate this, the SSAI delivers a new playlist 614 which is played by the end-users.

The process begins with a Stream Receiver, Parser and Decoder 602 taking adaptive input stream 601 from a Stream Playout 600. 602 handles authentication or authorization schemes as applicable, decrypts segments if the adaptive input stream 601 is DRM protected. Header information in the playlist along with segment 603 is passed on to a Cue Detector 606 to detect advertisement cues in Content Segments 604 or a header. Cue information detected is in format {Splice PTS, Break Type, Media Index, duration (optional, if stated in Cue information)} shown as 607. Break Aggregator 608 aggregates smaller advertisement breaks into larger one or a very large break into reasonable size chunks for easier replacement. The Boundary Annealer and Segmenter 610 separates content and advertisement portions if Content-Advertisement boundary is on a single media segment, the Boundary Annealer and Segmenter 610 also segments detected input advertisement(s) into fixed duration segments. Playlist Builder and Server 613 receives chunked and annealed segments with position and duration information 612 and builds output playlist 614 with ServeAd and Beacon redirections. Beacon redirections are periodic redirections to User Tracker Server (UTS) 616 and ServeAd redirections are redirections to the RCS 622. The ServeAd redirections had chunked advertisement segments as URL parameters. The Playlist Builder and Server 613 also serves built playlist 614 to devices 605.

Devices playing output stream 605 periodically reach out to the UTS 616 because of Beacon redirections in playlist 614. The UTS 616 thus keeps track of users playing stream all the time this way. The Playlist Builder and Server 613 also informs Replacement Advertisement Builder (RAB) 619 about break detected in the adaptive input stream as 618. The RAB 619 gets active users information 630 from UTS 616 and fetches advertisements from Advertisement Server 625 shows as Fetch Advertisements 627. Received advertisements are transcoded by Advertisement Transcoder 620, shown as 621. The RAB 619 builds a mapping of replacement advertisement segment per active user, per detected advertisement segment.

Devices playing output stream 605 reach out to Replacement Content Server (RCS) 622 during advertisement break due to ServeAd redirections 624. The RCS 622 now requests replacement segment for this active user 630, this media sequence from advertisement builder 619 as shows as 623. The RCS 622 redirects player to replacement segment if replacement advertisement is fetched or to input advertisement segment.

As and when replacement advertisement segments are downloaded by devices 605, 622 sends quartile URLs to Quartile reporter 626. The Quartile reporter 626 reports advertisement playback progress to Advertisement Server 625 as depicted by 629.

If there is overloading in the Advertisement Replacement System (ARS) 660, the Load Switch 615 commands the Playlist Builder and Server 613 to stop inserting Beacons and ServeAds into the playlist. The ARS 660 is reconfiguring while the load is reduced or when the ARS 660 is scaled for handling a higher load, the Load Switch 615 instructing the Playlist Builder and Server 613 for inserting ServeAds and Beacons again.

Figure 7A:
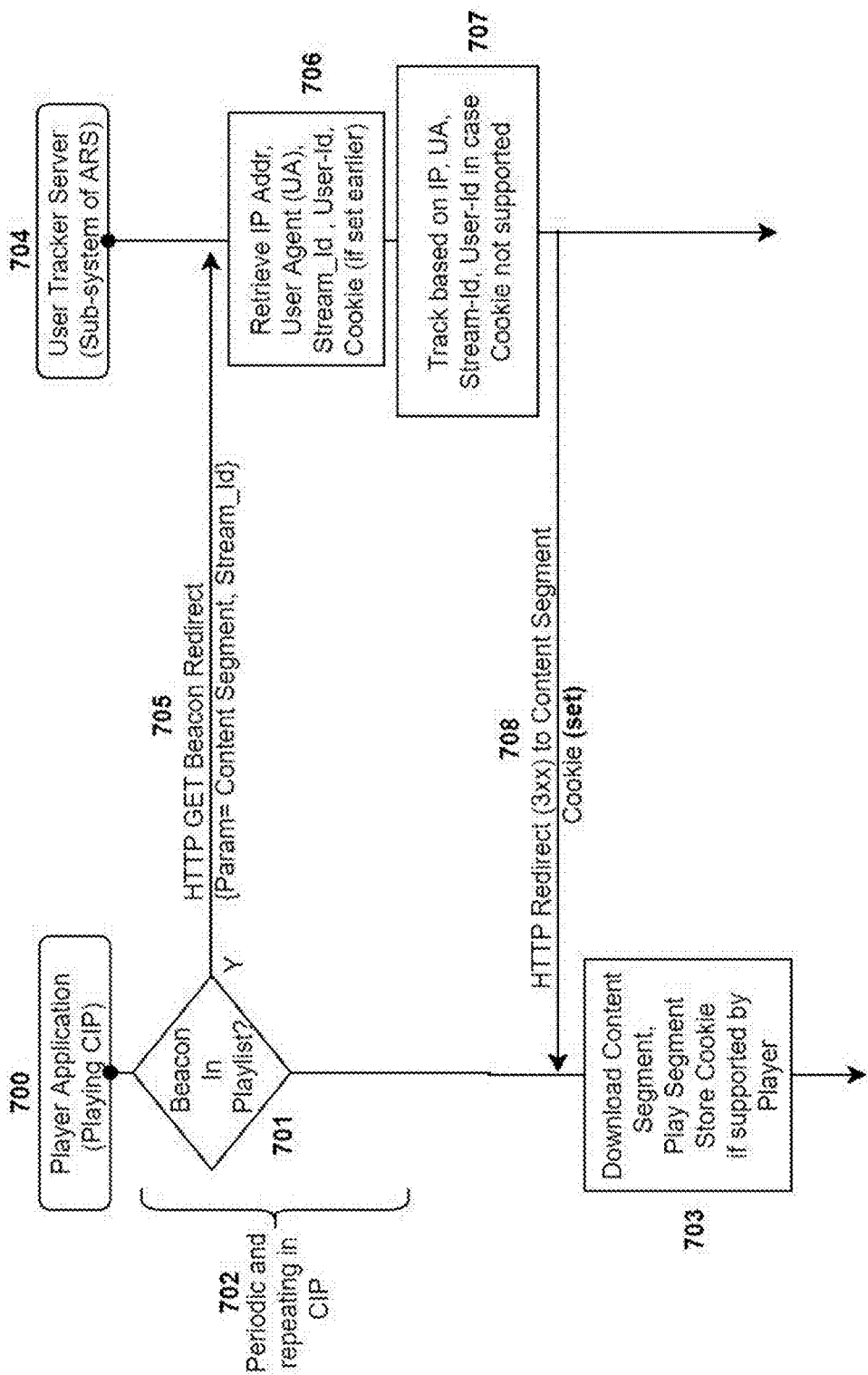
FIG. 7a illustrates the SSAI system tracking end-users.

FIG. 7a shows SSAI system tracking users. Users play 700 the CIP which is the output of the ADPI. The ADPI inserts periodic redirections called Beacons in the playlist 701 for the User Tracker Server (UTS) 704 which is part of a subsystem of the ARS. Periodic redirections help the SSAI to know if the user is still playing the stream (active) 701. The UTS tracks users uniquely based on Cookies if supported by player 706 or by the User-Agent, IP address and or by any other identifier like device-Id 707 provided by the Player Application. Salient points of message sequence between the Player Application and UTS are, HTTP GET 705 requests from the player (Beacon) and is responded by UTS with HTTP 3XX response redirecting player back to Content Segment 708. Player Application 700 downloads and plays segments and store cookie as shown in 703. The UTS tracks user 707 by planting Cookie 708, in case Cookie is not supported 707 distinguishing parameters like {User-IP, User-Agent, and Stream-ID} are tracked. Some implementations of the UTS can also track by identifier provided explicitly by the player like User-Id or Device-Id. Beacon redirections 705 are periodic and repeating as shown by 702. With the help of periodic and repeating Beacon redirections, the UTS 704 always know active users playing the CIP.

Figure 7B:
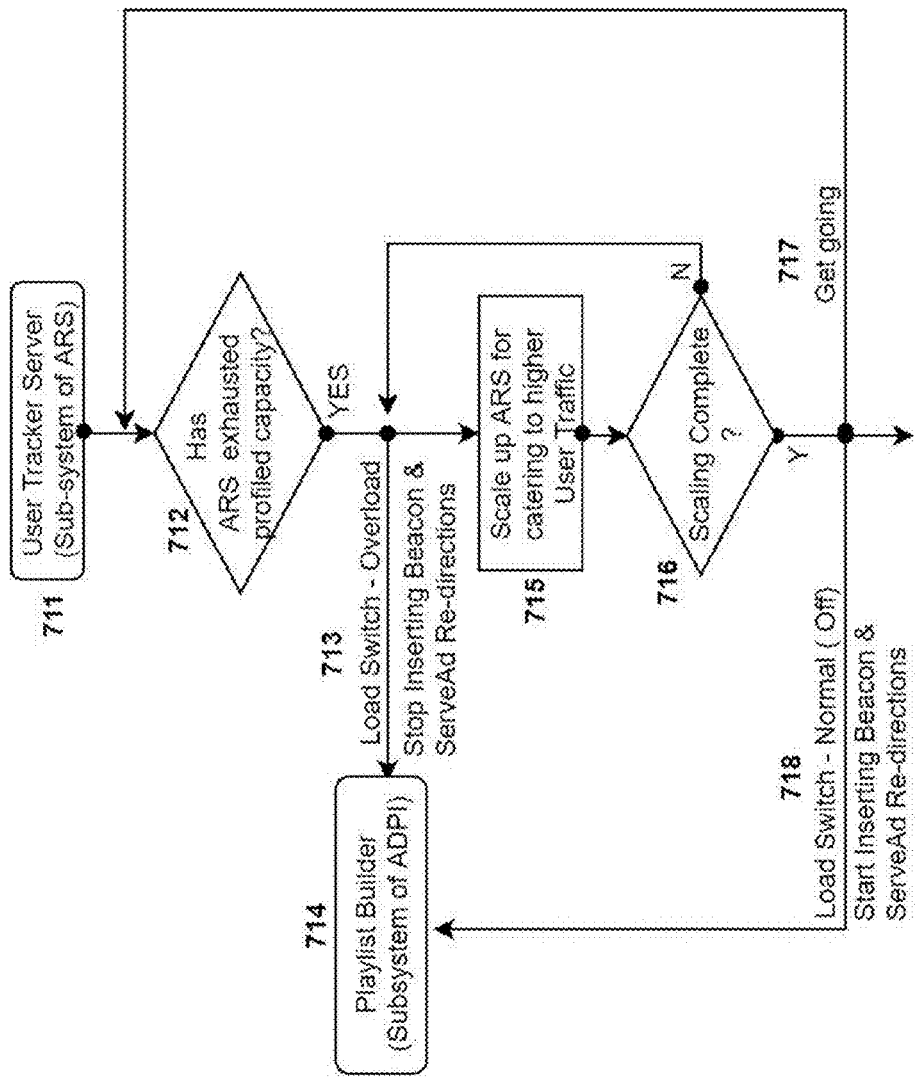
FIG. 7b illustrates the SSAI system catering to scale.

FIG. 7b illustrates SSAI system catering to scale. The User Tracker Server (UTS) 711 knows an active number of users all the time. Hence it is in the best position to take decisions for scaling service. The UTS has profiled information about the capacity of the ARS 211 to server replacement advertisements. The UTS always tracks if the ARS has exhausted its capacity as shown in 712. UTS instructs Playlist Builder 714 to stop inserting Beacons and ServeAd 713 into output playlist CIP when profiled capacity of the ARS has exceeded, that makes the CIP equivalent to an input stream. This makes SSAI a simple pass-through. Service continuity and Zero downtime ensured when Playlist Builder stops inserting Beacons and ServeAd, but advertisement revenue is lost for the duration of re-configuration. Re-configuration to downscale or upscale the ARS 715 to meet changing traffic conditions is done to handle the sudden change in the demand, the ARS is also re-configured to lower capacity when a surge in demand has subsided 716. Once the scaling is complete the Playlist Builder 714 to start insertion of Beacon and ServeAds 718 this enables the ARS 211 to track users and replace advertisements with enhanced capacity.

Figure 7C:
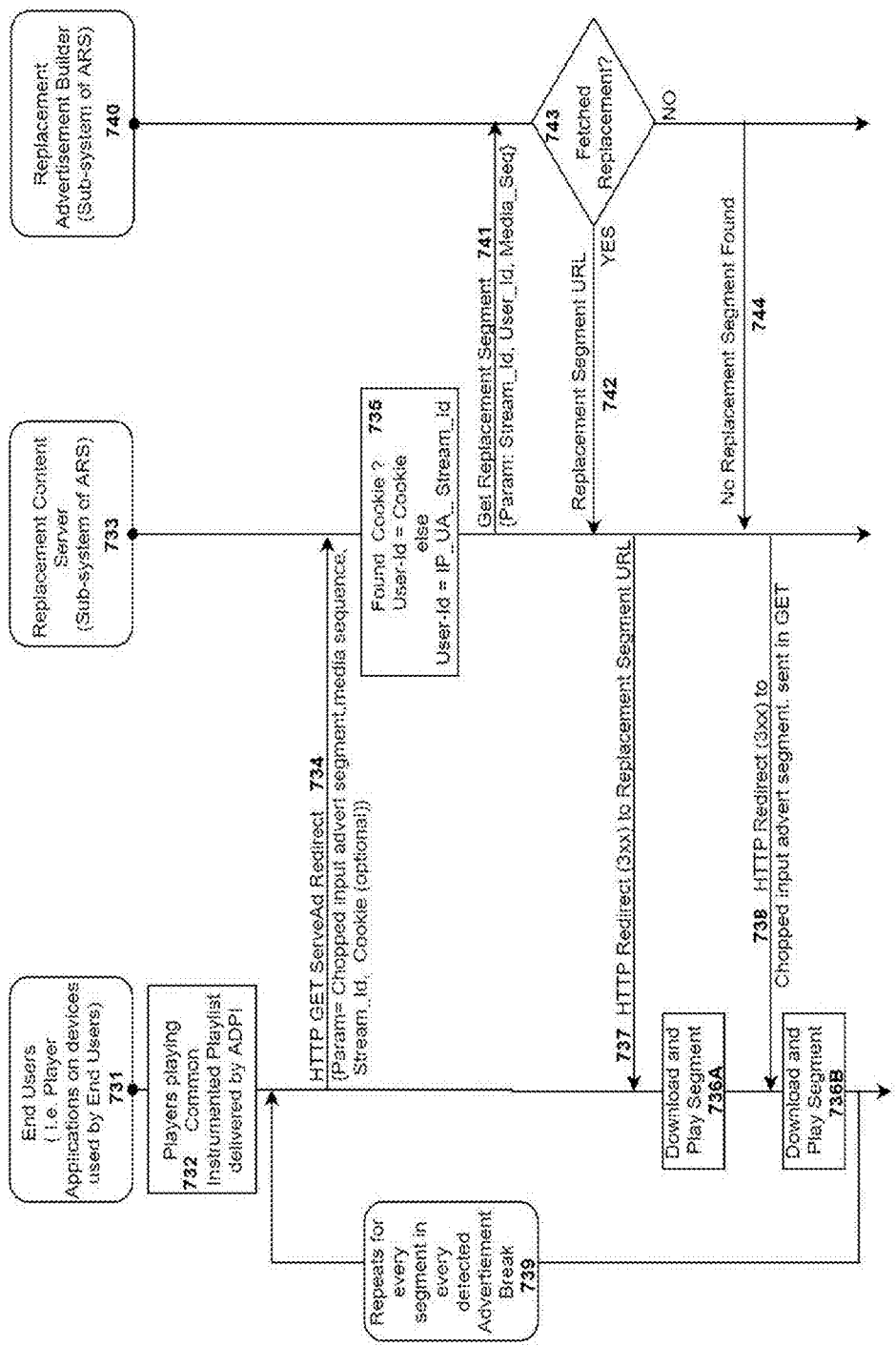
FIG. 7c illustrates the SSAI system serving advertisements.

FIG. 7c shows the SSAI system serving advertisements. Users 731 represented by Player Applications 732 playing CIP which is the output of the ADPI. The ADPI inserts 734 redirections to Replacement Content Server (RCS) 733 which is a sub-system of the ARS, for a duration of each advertisement break detected, for every chopped input advertisement segment. The RCS serves replacement advertisement or detected input advertisement segment if replacement advertisement is not available. Salient points of message sequence between Player Application 731 and RCS 733 are as follows, HTTP GET request 734 from the player is responded with HTTP 3XX response 737 redirecting player to either replacement advertisement segment 742 or chopped input advertisement segment 738. The player continues to send GET requests 734 as per the CIP, and that is until advertisement break ends. The RCS 733 retrieves users-Id for user either Cookie or based on IP or User-Agent as shown in 735. The RCS 733 subsequently tries to get the replaced advertisement segment 741 from the RAB 740. The RAB 740 checks if the advertisement is fetched for this user 743. In case it is, the RAB 740 sends back replacement advertisement segment 742 to the RCS 733 else sends back empty response 744. Based on the RAB's response the RCS redirects the user to replacement advertisement segment 737 or chopped input advertisement segment 738. Player Application will download and play replaced advertisement 736A or a chopped input advertisement segment 736B based on the response of the RCS 733. This entire process continues for every advertisement break as in 739, while the user is playing the CIP, i.e., output of the SSAI. The Player Application does not know about this arrangement and does not need any change.

Figure 7D:
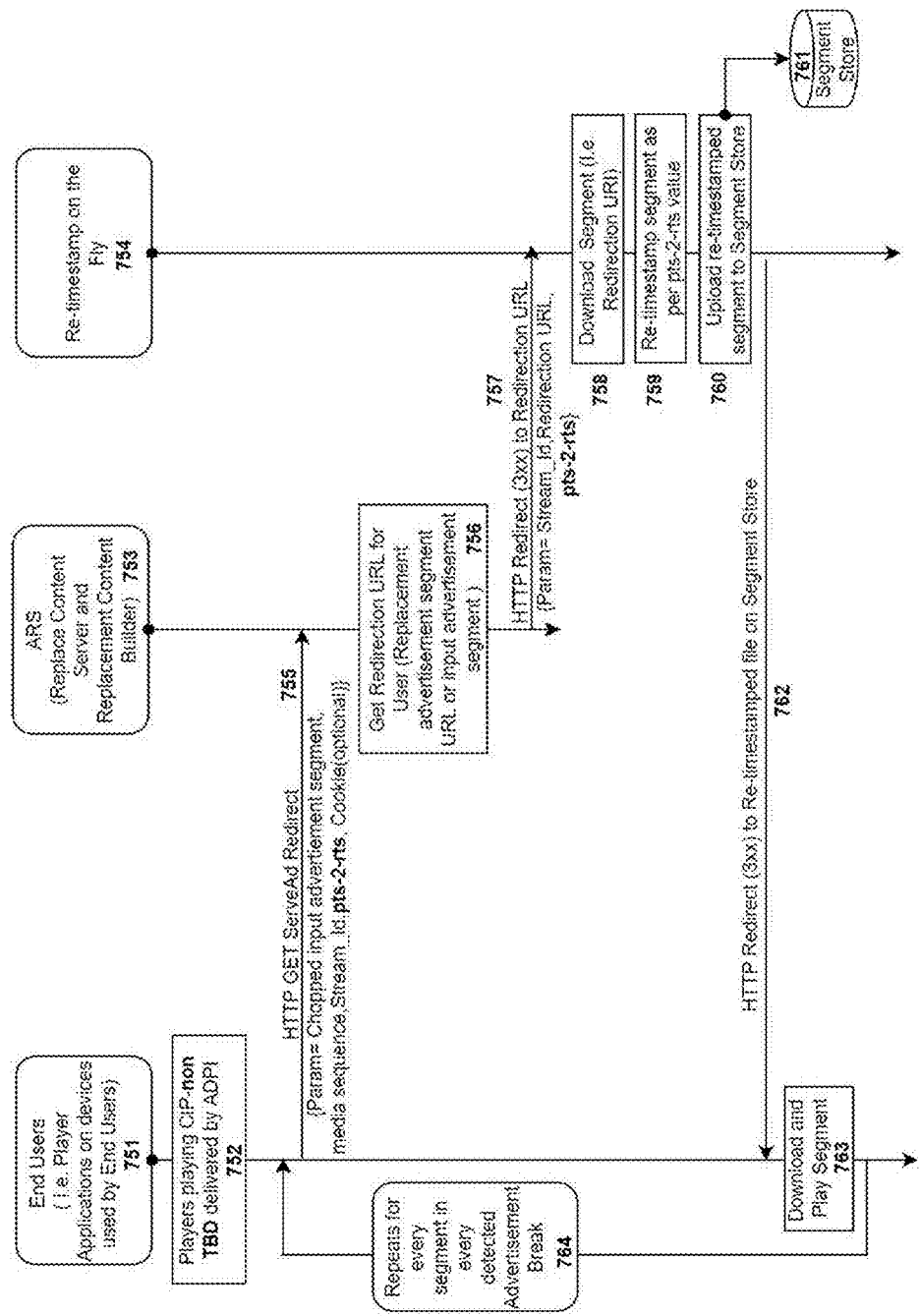
FIG. 7d illustrates a message sequence of the retime stamping on the fly.

FIG. 7d elaborates message exchange between SSAI and re-timestamp on the fly module. User 751 represented by the Player Applications playing the CIP non-TBD 752 as delivered by the ADPI. CIP hosts ServeAd redirections for entire advertisement, these ServeAd segment URLs carry PTS-2-RTS parameter in addition to existing parameters like chopped input advertisement segment URL as shown in 755. The ARS retrieves replacement advertisement segment for users as shown in 756. Getting redirection URL for the users 756 is communication between RCS 733 and RAB 740 as explained in FIG. 7d. The ARS redirects request 757 to Re-timestamp on the fly module 754. Re-timestamp on the fly module 754, downloads received URL 758, re-timestamps 759 and uploads 760 to storage location 761. Re-timestamp on the fly module 754 redirects user subsequently to a re-timestamped segment 762. Users (represented by Player Application) 751 subsequently downloads and play segment received via 762. The re-timestamping process needs to be repeated for every advertisement break, every segment to ensure playback on devices not supporting TBD 508b. This is shown in 764.

The SSAI solution proposed herein principle is one method of tracking users and replacing a portion of a stream can be used for multiple use cases and not limited to advertisement replacement alone. For example, tracking users and replacing a portion of a stream may be used for replacing a content block, may be used for realizing forensic watermarking. In addition to video advertisement replacement, the same methodology could be extended to graphics insertion and replacement as well.

The proposed embodiment of SSAI plays output in time order to support playback of output on virtually every device supporting adaptive streaming playback.

SSAI and its embodiment uses Content Delivery Networks (CDN), CDNs cache SSAI (and embodiment) output and deliver. Integration with CDN provides added efficiency to the SSAI as every request with precisely same headers reaches the SSAI only once. The CDN integration workflows for efficient delivery or otherwise are not illustrated as part of innovation, as they are typical.

What is claimed is:

1. A scalable, multi-platform, seamless Server-side Ad-Insertion (SSAI) system with a single stream input and output having (a) a Stream Playout (202), (b) an Advertisement Detector and Playlist Instrumenter (ADPI) (204), (c) a Load Switch (210), (d) an Advertisement Replacement System (ARS) (211), (e) an Advertisement Server (212), (f) a plurality of users (216a-c), and (g) one or more third parties (215) wherein:

a) an adaptive input stream (201) having content and advertisement triggers is sent;

b) the ADPI (204) puts out Advertisement Break position and duration (206) for the ARS (211) and a Common Instrumented Playlist (CIP) (205) for the users (216a-c) wherein:

i) the CIP (205) contains a list of URLs which includes content URLs, Beacon redirections (208) and ServeAd redirections (209);

ii) the Beacon redirections (208) is added periodically in the CIP (205) so that the users often reach out to the ARS (211) to mark presence of the users;

iii) the ServeAd redirections are added to the ARS (211) only during an advertisement break so that the ARS (211) can replace in-stream advertisements;

iv) the ADPI (204) looks for different types of advertisement cues in input manifest and Content Segments (203), and sends detected cues to the Advertisement Replacement System (ARS) (211) as the Advertisement Break position and duration (206);

v) the Advertisement Break position and duration (206) includes (a) Media sequence, (b) Presentation Timestamp (PTS) in Media segment where the advertisement Audio/Video (A/V) begins or ends, (c) duration, and (d) cue type; and vi) the ADPI (204) chops detected advertisements into constant duration segments and add a matching number of ServeAd redirections in the CIP (205) with URL to a chopped segment as URL parameter, thus gives the flexibility to replace any detected advertisement with multiple combinations of unrelated advertisements;

c) the ADPI (204) and ARS (211) are load-balanced by the Load Switch (210) when they need to scale according to user-demand such that:

i) during the scaling process, the ARS (211) cannot serve the replacements or track users;

ii) when the ARS (211) starts scaling, it sends a signal to the ADPI (204) asking the ADPI (204) not to add the Beacons (208) or ServeAds redirections (209) in the CIP (205) for the duration of scaling; and iii) post scaling the ARS (211) informs the ADPI (204) to start adding the Beacons (208) or ServeAd redirections (209) again;

d) the ARS (211) communicates with the Advertisement Server (212) to enable fetching advertisements (213) for every user and reports successful advertisement playback (214) wherein:
  i) the ARS (211) receives periodic Beacon redirections (208) from the plurality of users (216*a-c*) as the users play the CIP (205);
  ii) the ARS (211) tracks the users based on IP Address, User-Agent, Cookie or any other parameter made available, thus the ARS (211) knows active users playing the CIP (205) all the time;
  iii) for each active user, for every break information (206) received from the ADPI (204), the ARS (211) requests advertisements (213) from the Advertisement Server (212);
  iv) the Advertisement Server (212) responds with an acknowledgment message, said response includes an advertisement, if available with the Advertisement Server (212);
  v) request Fetched advertisements (213) parameters sent to the Advertisement Server (212) includes duration, unique user identifier, IP Address and User-Agent representing the user request sent for;
  vi) when the users reach out to the ARS (211) during the ServeAd redirections (209), said ARS (211) serves them the Fetched advertisements (213);
  vii) the ARS (211) redirects users to replace advertisement segment if fetched, else use chopped original advertisement segments; and
  viii) the ARS (211) reports Quartiles (214) for all users and all breaks, once the segment is downloaded by the user's player;
e) a plurality of users (216*a-c*) on a plurality of devices and platforms communicate with the ARS (211) such that:
  i) an output stream (207) sends the periodic Beacon redirections (208) to the ARS (211) for tracking the active users and sends the ServeAd redirections (209) that facilitates serving different advertisement per user to the ARS (211) for every segment of a detected advertisement;
  ii) the user's player fetches the unmodified Content Segments (203) from the Stream P layout (202);
  iii) the user's player requests advertisement segment as per the CIP (205) from the ARS (211) based on the ServeAd redirections (209); and
f) third parties (215) are Stream Playout and Advertisement Server(s).

2. The system of claim 1 wherein the adaptive input stream (201) carries content and advertisement cues, where cue information:
  a) may be blended in Audio and Video;
  b) a separate metadata stream with cue information or could be in-stream manifest; and
  c) cues may be SCTE35 standard, DTMF standard tones and non-standard system watermark.

3. The system of claim 1 wherein the Advertisement Replacement System (ARS) further comprises (a) a Replacement Advertisement Builder (RAB) (305), (b) a User Tracker server (UTS) (306), (c) an Advertisement Transcoder (311), (d) a Replacement Content Server (RCS) (315), (e) a Quartile Reporter (316), (f) a Trans-coded content store (319), and (g) Load Switch (320) wherein:
  a) the Replacement Advertisement Builder (RAB) (305):
    i) receives frame accurate information about detected advertisement break from the ADPI (302) in the form of Advertisement Break position and duration (304);
    ii) receives a list of active users (307) from the User Tracker Server (UTS) (306);
    iii) fetches advertisements for all active users, covered by Advertisement Request and Response (310) and transcodes advertisements with the help of the Advertisement Transcoder (311);
    iv) sends transcoding requests (312) for every unique advertisement received from the Advertisement Server (309); and
    v) maintains replacement advertisement mapping per active user, per detected advertisement segment, such that the mapping format is {media sequence (351), stream-Id (352), user-Id (353), replaced segment (354), reporting URLs (355)};
  b) users (322) play CIP (303) and periodically reach out to the User Tracker Server (UTS) (306) which further:
    i) tracks the users uniquely based on Cookie or by User-Agent, IP Address and or by any other identifier like device-Id provided by the Player Application; and
    ii) redirects the users (322) back to content segment received as URL parameter in Beacon redirections (308);
  c) the Advertisement Transcoder (311) further:
    i) receives advertisement transcoding requests (312) from the RAB (305);
    ii) performs format conversion of received advertisements from the Advertisement Server (309) to match quality attributes of the adaptive input stream (301) played by Stream Playout (300); and
    iii) chunks received advertisements into segments of duration matching chopped input advertisement segments;
  d) the users (devices of end users) (322) play the CIP (303) and reach out to the Replacement Content Server (RCS) (315) during an advertisement break, said RCS (315) fetches replacement mapping 313 for a ServeAd request when the ServeAd redirections (314) reaches the RCS (315) and notifies the Quartile Reporter (316) to Report Quartiles (318) for downloaded advertisement segment with reporting URL (317);
  e) the Quartile Reporter (316) does Quartile reporting once it receives advertisement segment download confirmation and reporting URL (317) from the RCS (315) which is done for all Quartiles, for all replacement advertisements, for all breaks, and for all users;
  f) the Trans-coded Content Store (319) stores the output of the Advertisement Transcoder (311) that transcodes advertisement in A/V format matching input stream A/V characteristics; and
  g) the Load Switch (320) is a switch to stop insertion of ServeAd and Beacon redirections when the ARS has exceeded its capacity to serve replacement advertisements, said Load Switch (320) is instructed to start insertion of ServeAd and Beacon redirections again when the ARS is reconfigured to meet higher demand.

4. The system of claim 1 wherein the Advertisement Detector and Playlist Instrumenter (ADPI) further comprises (a) a Stream Receiver, Parser, and Decoder (402), (b) a Cue Detector (404), (c) a Break Aggregator (406), (d) a Boundary Annealer and Segmenter (407), (e) a Segment Store (408), (f) a Playlist Builder (409), and (g) a Playlist Server (410) wherein:
  a) the Stream Receiver, Parser, and Decoder (402), further comprises:

i) a Stream Receiver that handles authentication and authorization schemes as applicable and hands over a playlist variant stream to a Parser;
ii) the Parser parses chosen playlist variant, downloads each segment;
iii) the Decoder does content decryption if adaptive input stream (401) is DRM protected; and
iv) the Stream Receiver, Parser, and Decoder (402) hands over downloaded segment (403) along with header information to the Cue Detector (404);

b) the Cue Detector (404) further:
i) receives the downloaded segment (403) along with the header information in input stream variant, the cue information may be available as an encoded header in playlist variant just above segment URL or in a Content Segment; and
ii) looks for advertisement cues, in headers or Content Segment, the cue information (405) is passed on to the Break Aggregator (406);

c) the Break Aggregator (406) aggregates smaller breaks into a larger break, to facilitate larger choice for a replacement, also it breaks very large advertisement breaks into reasonable size chunks wherein break information is conveyed in the format, {Splice PTS, Break Type, Media Index, duration} wherein:
i) splice PTS is frame accurate position in Audio/Video (A/V) segment expressed as Timestamp;
ii) break Type indicates start or end of an Advertisement Break;
iii) media Index is segment number in the variant playlist, where change was noticed;
iv) duration is not always available more so for Live input streams {0x12345678, begin, 48}, {0x5aibaba, end, 53}, which means advertisement break started at splice PTS of 0x12345678 in segment 48, ended at 0x5aibaba in segment 53; and
v) media index and PTS values are maintained cross-referenceable across playlist variants;

d) the Boundary Annealer and Segmenter (407) further:
i) re-encodes a portion of content via the Annealer when the content-advertisement boundary is in within a segment and serves them separately; and
ii) the Segmenter chops detected input advertisement segments into fixed size smaller duration chunks, store them in the Segment Store (408), this chopping helps during advertisement replacement, as every chopped segment could be a replacement advertisement;

e) the Segment Store (408) has chopped input advertisement segment by the Boundary Annealer and Segmenter (407), these segments shall be part of output playlist CIP (411*a*), replacement advertisement will be served instead of these segments or will be served as is if no replacement is available;

f) the Playlist Builder (409) builds a playlist with periodic redirection to the User Tracker Server (306) (UTS), a subsystem of the ARS (414) called Beacon redirections and redirections to the Replacement Content Server (315) (RCS), a subsystem of the ARS (414) called as ServeAd redirections along with Content Segments;

g) the Playlist Builder (409) adds ServeAd redirections only during advertisement break, said ServeAd redirections carry chopped input advertisement segments stored in the Segment Store (408) as URL parameters;

h) the CIP (411*b*) includes discontinuity markers before and after every ServeAd redirection, Playlist is represented by CIP (411*a*); and i) the Playlist Server (410) serves the CIP (411*a*) built by the Playlist Builder (409) to all users (415), said Playlist Server (410) is a typical HTTP server configured for the SSAI.

5. The system of claim 1 wherein the Common Instrumented Playlist (CIP) (411*b*) is communication between users (415) and the ADPI (204), built by the Playlist Builder (409), such that:
a) CIP comprises of Content Segments, Beacon redirections, ServeAd redirections only during advertisement break;
b) the Playlist Builder (409) includes discontinuity markers before and after every ServeAd redirections in the CIP (411*b*);
c) the users play the CIP (411*b*) and thus periodically reach out to the UTS (306) due to the Beacon redirections in the CIP, this helps the UTS (306) to track every user;
d) beacon redirections have redirection URL as a parameter, the UTS (306) redirects the user back to this URL after marking his presence;
e) the users while playing the CIP (411*b*) and reach out to the RCS (315) during advertisement break; and
f) the RCS (315) redirects the users to replacement advertisement(s) or input chopped advertisement segment(s) stored in the Segment Store (408).

6. The system of claim 1 wherein the ARS (414) receives information from the ADPI in the format {Splice PTS, Break Type, Media Index, duration} wherein:
a) splice PTS is frame accurate position in Audio/Video (A/V) segment expressed as Timestamp, Break Type indicates start or end of an Advertisement Break, Media Index is segment number in a variant playlist, where change was noticed, the duration is not always available more so for Live input streams;
b) the media index and PTS values are same and can be cross-referenced across variants, said message format look similar to communication between the Cue Detector (404) and Break Aggregator (406), this is because of the Break Aggregator (406) aggregates break; and
c) these aggregated breaks are communicated to the ARS (414) by the Playlist Builder (409).

7. The system of claim 1 wherein the Load Switch (413):
a) actively commands the Playlist Builder (409) to stop inserting Beacons and ServeAds into the playlist when the ARS (414) is overloaded; and
b) instructs the Playlist Builder (409) to start insertion of ServeAds and Beacons again when the load is reduced or when the ARS (414) is scaled to handle a higher load.

8. The system of claim 1 further comprising Re-timestamping on the Fly having (a) a Stream Playout (500), (b) an adaptive input stream (501), (c) an Advertisement Detector and Playlist Instrumenter (ADPI) (502), (d) Common Instrumented Playlist (CIP) (503), (510) (e) Content Segments (504), (f) Beacon redirections (505*a*), (505*b*) (g) Advertisement Break position and duration (506), (h) ServeAd redirections (507*a*), (507*b*), (*i*) Consumer Electronics (CE) devices (508*a*), (508*b*), (*j*) an Advertisement Replacement System (ARS) (509), (k) an Advertisement Server (511), (l) Fetching Advertisements (512), (m) Report Quartiles (513), (n) a Load Switch (514), (o) a Re-timestamp on the Fly module (RTF) (515), (p) re-timestamp request (516), (q) Re-timestamped advertisement segments (517) and (r) Third parties (518), wherein:
a) the SSAI publishes two different CIP playlist(s), CIP (509) to support non-TBD devices and CIP (503) as usual for TBD supporting devices, and the Common Instrumented Playlist CIP (Non-TBD) (510) removes discontinuity tags in the playlist so that the Player is informed that the content is continuous in time order;

b) for every advertisement segment URL in the CIP (510), PTS-2-RTS (PTS to Re-Time-Stamp) is added as URL parameter, the PTS value is the start PTS of the corresponding input advertisement segment detected;

c) the ADPI (502) is enhanced to publish two different CIP(s), the CIP (503) to cater to all devices supporting in-stream discontinuity indicator in the playlist(s) and the CIP (510) to support devices which do not support discontinuity in the playlist;

d) the ARS (509) needs a small enhancement, when the ARS (509) receives the ServeAd redirections (507*b*) with PTS-2-RTS parameter as per the CIP (510), said ARS (509) retrieves the replacement advertisement and re-timestamps advertisement segment (517) before serving to the user with the help of the Re-timestamp on the Fly module (RTF) and the ARS (509) redirects the replacement URL to the RTF (515) to re-timestamp replaced advertisement segments and serve;

e) the Re-timestamp on the Fly module (RTF) (515) re-timestamps the replacement segment received from the ARS (509) as per PTS-2-RTS parameter and serves to the user;

f) the Beacon redirections (505*b*) are same as the Beacon redirections (505*a*), there is no impact on user tracking behavior, because of the re-timestamping;

g) the ServeAd redirections (507*b*) in the CIP non-TBD (510) continue to redirect to the ARS (509);

h) the Re-timestamped advertisement segments (517) are re-timestamped advertisement segment as per PTS-2-RTS URL for which the request to re-timestamp (516) is received; and i) the third parties (518) like Stream Playout (500) produces adaptive input stream, and the Advertisement Server (511) serves advertisements when requested by ARS (509).

9. A scalable, multi-platform, seamless Server-side Ad-Insertion (SSAI) method with a single stream input and output having (a) Stream Playout (600), (b) a Stream Receiver, Parser and Decoder (602), (c) a plurality of users (605), (d) a Cue Detector (606), (e) a Break Aggregator (608), (f) a Boundary Annealer and Segmenter (610), (g) a Segment Store (611), (h) a Playlist Builder and Server (613), (i) a Load Switch (615), (j) a User Tracker Server (UTS) (616), (k) a Replacement Advertisement Builder (RAB) (619), (l) an Advertisement Transcoder (620), (m) a Replacement Content Server (RCS) (622), (n) an Advertisement Server (625), and (o) a Quartile Reporter (626), comprising the steps of:

a) advertisement Detection and Playlist Instrumentation (ADPI) (650) further comprising the steps of:

i) starting the process with the Stream Receiver, Parser and Decoder (602) taking an authenticated input stream (601) from the Stream P layout (600);

ii) handling authentication and authorization schemes as applicable by the Stream Receiver and passing over a playlist variant stream to the Parser for parsing and downloading each segment;

iii) decrypting the content by the Decoder if the adaptive input stream (601) is DRM protected;

iv) receiving the stream segment along with header information (603) by the Cue Detector (606) and looking for advertisement cues in headers or in Content Segments (604) and passing the cue information to the Break Aggregator (608) for conveying the break information (607) in the following format, {Splice PTS, Break Type, Media Index, duration wherein:

A) splice PTS indicates precise Presentation Time Stamp (PTS) where content is switched to an advertisement, the PTS is a reference to audio and video frame where the content has stopped, and an advertisement started;

B) break Type indicates start or end of an Advertisement Break;

C) media Index is segment number in a variant playlist, where change was noticed;

D) duration is not always available more so for Live input streams {0x12345678, begin, 48}, {0x5aibaba, end, 53} which means advertisement break started at splice PTS of 0x12345678 in segment #48, ended at 0x5aibaba in segment 53; and E) media index, PTS values are maintained cross-referenceable across playlist variants;

v) aggregating (609) smaller breaks into larger breaks by the Break Aggregator (608) to facilitate larger choice for a replacement, also breaking very large advertisement breaks into reasonable size chunks typically a multiple of 5 seconds, often 5, 10, 15, 20 or 30 seconds;

vi) re-encoding a portion of the content by the Boundary Annealer in the Boundary Annealer and Segmenter (610) when the content-advertisement boundary is within a segment and serving them separately;

vii) chopping media segments into smaller chunks by a Segmenter present within the Boundary Annealer and Segmenter (610) and storing them in the Segment Store (611) and serving, thus imparting higher flexibility during advertisement replacement; and viii) the Playlist Builder and Server (613) builds output playlist (614) with periodic redirections to the UTS (616) called Beacons, these are used to track users, said output playlist (614) also includes redirections to the RCS (622) only during advertisement break with URL parameters referring to chopped input advertisement which are stored in the Segment Store (611) called ServeAd redirections;

b) advertisement Replacement (ARS) (660) further comprising the steps of:

i) playing the output playlist (614) by the end-users in playing devices (605), said output playlist (614) comprises periodic redirections in the form of Beacon redirections (617) which is utilized by the User Tracker Server (UTS) (616) for tracking users and ServeAd redirections (624) that helps the Replacement Content Server (RCS) (622) for replacing advertisement segments where the output playlist (614) is the communication between the users and the ADPI (650);

ii) conveying the Advertisement Break position and duration (618) every time to the Replacement Advertisement Builder (RAB) (619) by the Playlist Builder and Server (613), the format is like that between the Cue Detector (606) and Break Aggregator (608)

iii) communicating the aggregated breaks to the Advertisement Replacement System (RCS) (660) by the Playlist Builder and Server (613);

iv) receiving a list of active users (630) by the RAB (619) from the UTS (616), and Fetching advertisements (627) for all active users from the Advertisement Server (625);
v) transcoding the received advertisements (621) with the help of the Advertisement Transcoder (620);
vi) maintaining a mapping of replacement advertisement per active user, per detected advertisement segment (623) in the RAB (619) which is presented by the RCS (622) based on the ServeAd redirections (624); and
vii) reporting Quartiles (629) to the Quartile Reporter (626) by the RCS (622), once replacement segment is served for downloaded advertisement segment with reporting URL (628), this is done for all Quartiles for all the replacement advertisements, for all breaks, and for all users;
c) load Balancing wherein the Load Switch (615) commanding the Playlist Builder and Server (613) if there is overloading in the Advertisement Replacement System (ARS) (660), stopping to insert Beacons and ServeAds into the playlist further comprising the steps of:
  i) reconfiguring the ARS (660) while the load is reduced or when the ARS (660) is scaled for handling a higher load; and
  ii) instructing the Playlist Builder and Server (613) for inserting ServeAds and Beacons again.

10. The method of claim 9 for tracking users, further comprising of:
a) the users1 playing (700) the CIP which is the output of the ADPI, said ADPI inserts periodic redirections called Beacons in the playlist (701) for the User Tracker Server (UTS) (704) which is part of a subsystem of the ARS;
b) beacons redirect the users to the UTS (705);
c) the UTS identifies the users based on IP Address, Cookie, User-Agent, Stream-Id parameters and sets Cookie (706), (707), if supported by the CIP (700); and
d) the UTS redirects the user back to the Content Segment (708) post tracking activity;
e) the Player Application downloads segment stores Cookie if supported and plays segment (703); and
f) with the help of periodic and repeating Beacon redirections, the UTS (704) always know active users playing the CIP (702).

11. The method of claim 9 for load balancing wherein:
a) user Tracker Server (UTS) (711) always knows active users which the ARS is catering to, when the ARS has exceeded profiled capacity (712), the UTS instructs the Playlist Builder (714) to stop inserting Beacons and ServeAds into output playlist CIP;
b) when the Playlist Server stops inserting Beacons and ServeAd (713) into output playlist CIP, that makes the CIP equivalent to an input stream, thus the SSAI becomes a simple pass-through;
c) re-configuration to downscale or upscale the ARS to meet changing traffic conditions is done to handle the sudden change in the demand subsequently (715);
d) once reconfiguration is done (716), UTS (711) instructs Playlist Builder to start insertion of Beacon and ServeAds as in (718); and
e) this process continues as per change in Traffic patterns perpetually as shown by (717).

12. The method of claim 9 for ServeAd wherein:
a) the users (731) represented by Player Applications (732) play the CIP which is an output of the ADPI;
b) the ADPI inserts (734) redirections to the Replacement Content Server (RCS) (733) which is a sub-system of the ARS, for a duration of each advertisement break, detected for every chopped input advertisement segment; and
c) the RCS serves replacement advertisement such that message sequence between the Player Application (731), RCS (733) and RAB (740) include:
  i) HTTP GET request (734) from the Player is responded with HTTP 3XX response (737) redirecting the Player to either replacement advertisement segment (742) or chopped input advertisement segment (738);
  ii) the Player continues to send GET requests (734) as per the CIP, which lasts until the advertisement break ends;
  iii) the RCS retrieves users-Id for user either Cookie or based on IP or User-Agent (735), said RCS subsequently tries to get replaced advertisement segment (741) from the RAB (740);
  iv) the RAB checks if an advertisement is fetched for this user (743), in case it is, the RAB sends back replacement advertisement segment (742) to the RCS else sends back empty response (744);
  v) the users may not be served replacement advertisement as the user has just joined and hence no advertisement was fetched for him, or the Advertisement Server does not have advertisements when the ARS requests for a given user;
  vi) based on the RAB's response the RCS redirects the user to replacement advertisement segment (737) or chopped input advertisement segment (738);
  vii) the Player Application will download and play replaced advertisement (736A) or a chopped input advertisement segment (736B) based on the response of the RCS; and
  viii) this entire process continues for every advertisement break as in (739), while the user is playing the CIP which is the output of the SSAI, the Player Application does not know about this arrangement and does not need any change.

13. The method of claim 9 with re-timestamps on the fly further comprising the steps of:
a) user (751) represented by Player Applications playing the CIP non-TBD (752) as delivered by the ADPI, the CIP hosts ServeAd redirections for entire advertisement duration, these ServeAd segment URLs carry PTS-2-RTS parameter in addition to existing parameters chopped input advertisement segment URL (755);
b) the ARS retrieves replacement advertisement segment for users as (756);
c) the ARS redirects request (757) to the Re-timestamp on the Fly module (RTF) (754), said RTF (754) downloads received URL (758), re-timestamps (759) and uploads (760) to storage location (761);
d) re-timestamp on the Fly module (754) redirects the user subsequently to a re-timestamped segment (762), the users (751) subsequently downloads and play segment received via (762); and
e) the re-timestamping process needs to be repeated for every advertisement break, every segment to ensure playback on devices not supporting TBD (764).

\* \* \* \* \*